(12) United States Patent
Sherman et al.

(10) Patent No.: US 6,407,195 B2
(45) Date of Patent: *Jun. 18, 2002

(54) TACKIFIED POLYDIORGANOSILOXANE OLIGOUREA SEGMENTED COPOLYMERS AND A PROCESS FOR MAKING SAME

(75) Inventors: Audrey A. Sherman, St. Paul; Kurt C. Melancon, White Bear Lake, both of MN (US); Walter R. Romanko, Austin, TX (US); Mieczyslaw H. Mazurek, Roseville; Albert I. Everaerts, Oakdale, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,020

(22) PCT Filed: Apr. 25, 1996

(86) PCT No.: PCT/US96/05829

§ 371 (c)(1),
(2), (4) Date: Sep. 26, 1997

(87) PCT Pub. No.: WO96/34028

PCT Pub. Date: Oct. 31, 1996

(51) Int. Cl.[7] .................. C08G 77/04; C08G 77/02; C08L 83/10; C08J 3/28
(52) U.S. Cl. ............... 528/28; 528/38; 522/148; 522/172; 522/174; 525/477; 525/474; 525/454
(58) Field of Search ............... 528/28, 38; 522/148, 522/172, 174; 525/477, 474, 454

(56) References Cited

U.S. PATENT DOCUMENTS

| | | | |
|---|---|---|---|
| 2,676,182 A | 4/1954 | Daudt et al. | 260/448.2 |
| 2,736,721 A | 2/1956 | Dexter | 260/42 |
| 2,814,601 A | 11/1957 | Currie et al. | 260/29.1 |
| 2,857,356 A | 10/1958 | Goodwin, Jr. | 260/42 |
| 3,528,940 A | 9/1970 | Modic | 260/37 |
| 3,562,352 A | 2/1971 | Nyilas | 260/824 |
| 3,772,247 A | 11/1973 | Flannigan | 260/46.5 |
| 3,890,269 A | 6/1975 | Martin | 260/46.5 |
| 4,117,192 A | 9/1978 | Jorgensen | 428/352 |
| 4,447,493 A | 5/1984 | Driscoll et al. | 428/332 |
| 4,518,758 A | 5/1985 | Cavezzan et al. | 528/12 |
| 4,528,343 A | 7/1985 | Kira | 528/26 |
| 4,539,345 A | 9/1985 | Hansen | 523/219 |
| 4,563,539 A | 1/1986 | Gornowicz et al. | 556/421 |
| 4,605,712 A | 8/1986 | Mueller et al. | 525/474 |
| 4,736,048 A | 4/1988 | Brown et al. | 556/424 |
| 4,900,474 A | 2/1990 | Terae et al. | 252/358 |
| 4,908,208 A | 3/1990 | Lee et al. | 424/409 |
| 4,933,396 A | 6/1990 | Leir et al. | 525/410 |
| 4,948,859 A | 8/1990 | Echols et al. | 528/28 |
| 4,985,526 A | 1/1991 | Kishita et al. | 528/15 |
| 5,028,679 A | 7/1991 | Terae et al. | 528/12 |
| 5,091,483 A | 2/1992 | Mazurek et al. | 525/477 |
| 5,118,775 A | 6/1992 | Inomata et al. | 528/12 |
| 5,194,113 A | 3/1993 | Lasch et al. | 156/243 |
| 5,213,879 A | 5/1993 | Niwa et al. | 428/213 |
| 5,214,119 A | 5/1993 | Leir et al. | 528/28 |
| 5,236,997 A | 8/1993 | Fujiki | 524/731 |
| 5,268,433 A | 12/1993 | Ikeno et al. | 525/478 |
| 5,279,896 A | 1/1994 | Tokunaga et al. | 428/355 |
| 5,286,815 A | 2/1994 | Leir et al. | 525/477 |
| 5,290,615 A | 3/1994 | Tushaus et al. | 428/40 |
| 5,314,748 A | 5/1994 | Mazurek et al. | 428/345 |
| 5,391,015 A | 2/1995 | Kaczmarczik et al. | 404/14 |
| 5,461,134 A | 10/1995 | Leir et al. | 528/14 |
| 5,468,815 A | 11/1995 | Boardman et al. | 525/478 |

FOREIGN PATENT DOCUMENTS

| | | |
|---|---|---|
| DE | 3143994 | 5/1983 |
| EP | 0 250 248 | 12/1987 |
| EP | 0 311 262 | 4/1989 |
| EP | 0 455 585 | 11/1991 |
| EP | 0 540 332 | 5/1993 |
| JP | 4-214341 | 8/1992 |
| WO | WO 95/03354 | 2/1995 |

OTHER PUBLICATIONS

Encyclopedia of Polymer Science and Engineering vol. 15, pp. 178–181 and 265–270 (1989).*
Parin, "Constrained Layer Viscoelastic Vibration Damping," Techical Paper, *Society of Manufacturing Engineers*, (1989).
Yilgor et al., "Segmented Organosiloxane Copolymers—1. Synthesis of Siloxane—Urea Copolymers," *Polymer*, vol. 25, pp. 1800–1806 (Dec. 1984).
Tyagi et al., "Segmented Organosiloxane Copolymers—2. Thermal and Mechanical Properties of Siloxane—Urea Copolymers," *Polymer*, vol. 25, pp. 1807–1816 (Dec. 1984).
Tyagi et al., "Solid State Properties of Segmented Polysiloxane Thermoplastic Elastomeric Copolymers,"*Polymer Preprints*, vol. 24, No. 2, pp. 39–40 (Aug. 1983).

* cited by examiner

*Primary Examiner*—Robert A. Dawson
*Assistant Examiner*—Jeffrey B. Robertson
(74) *Attorney, Agent, or Firm*—Carolyn V. Peters

(57) ABSTRACT

Tackified compositions comprise a curable polydiorganosiloxane oligourea segmented copolymer which has alternating soft polydiorganosiloxane units and hard diisocyanate residues, the diisocyanate residue being the diisocyanate minus the —NCO groups. The units are connected together by urea linkages and the copolymer has end groups that are reactive under free radical or moisture cure conditions, and silicate resin. Also provided are pressure-sensitive adhesives, hot melt adhesives, and vibration damping composites, vibration damping constrained layer constructions, a bi-directional vibration damping constrained layer constructions, vibration damping shaped articles as well as a method of vibrationally damping an article and processes for producing curable vibration damping material.

51 Claims, 1 Drawing Sheet

TACKIFIED POLYDIORGANOSILOXANE OLIGOUREA SEGMENTED COPOLYMERS AND A PROCESS FOR MAKING SAME

TECHNICAL FIELD

This invention relates to tackified crosslinkable polydiorganosiloxane oligourea segmented copolymer, in particular to copolymers that are useful as pressure-sensitive adhesives, hot melt adhesives, vibration damping compositions, as well as articles made from such copolymers.

BACKGROUND OF THE INVENTION

Pressure-sensitive adhesive tapes have been used for more than half a century for a variety of marking, holding, protecting, sealing and masking purposes. Pressure-sensitive adhesive tapes comprise a backing, or substrate, and a pressure-sensitive adhesive. Pressure-sensitive adhesives are materials which adhere with no more than applied finger pressure and are aggressively and permanently tacky. Pressure-sensitive adhesives require no activation, exert a strong holding force and tend to be removable from a smooth surface without leaving a residue. In some applications, interesting pressure-sensitive adhesives are silicone based adhesives.

Traditionally, polydiorganosiloxane pressure-sensitive adhesives have been made in solution. Conventional solvent based polydiorganosiloxane pressure-sensitive adhesives are generally blends of high molecular weight silanol functional polydiorganosiloxanes, i.e., polydiorganosiloxane gums, and copolymeric silanol functional silicate resin, i.e., MQ resins, which comprise $R_3SiO_{1/2}$ units and $SiO_{4/2}$ units. In order to obtain the desired adhesive properties, it has been necessary to react the copolymeric silicate resin with the polydiorganosiloxane. Improvements in such pressure-sensitive adhesive properties are achieved when the copolymeric polydiorganosiloxane resin and polydiorganosiloxane are intercondensed, providing intra- and inter-condensation within the adhesive. This condensation step requires 1) the addition of a catalyst, 2) reacting the copolymeric polydiorganosiloxane resin and polydiorganosiloxane in solution, and 3) allowing the reaction to take place over a period of time at elevated temperature.

Solutions of intercondensed polydiorganosiloxane pressure-sensitive adhesives, are generally applied to a backing, heated to remove solvent, and crosslinked, if necessary, to improve physical properties. If crosslinking is needed, peroxide catalysts are commonly used. Disadvantages of solution applied polydiorganosiloxane pressure-sensitive adhesives include the need for elaborate drying ovens to remove solvent, and if crosslinking is required, ovens which operate at temperatures greater than 140° C. are needed to initiate diaryl peroxide crosslinking catalysts. Such high oven temperatures limit the substrates useful in making pressure-sensitive adhesive tapes to those which can withstand the elevated temperatures.

In the medical field, pressure sensitive adhesive tapes are used for many different applications in the hospital and health areas, but basically they perform one of two functions. They are used to restrict movement, such as in various strapping applications, or they are used to hold something in place, such as a wound dressing. It is important in each function that the pressure sensitive adhesive tape be compliant with and non-irritating to the skin and adhere well to the skin without causing skin damage on removal.

In recent years, pressure sensitive adhesives have been used in transdermal patch applications as drug transport membranes or to attach drug transport membranes to skin. Although there is continued development of new drugs and the need for different transport rates of existing drugs, pressure sensitive adhesives are still needed that can transport such drugs at various rates. Furthermore, there is a continuing need to adhere new drug transport membranes to skin during a treatment period.

In the automotive industry, there are applications that remain unaddressed by current tape products. One such application relates to automotive paints and finishes that are formulated for environmental conservation, recyclability, enhanced appearance, improved durability, as well as resistance to environmental sources of contamination. Painted substrates using these new formulations are difficult to adhere to with current tape products. Another application involves mounting thermoplastic polyolefin automotive body side moldings.

Similarly, early electrical tapes were black friction tapes, and the adhesive was soft and often split when unwound. Current electrical tapes have a layer of a pressure sensitive adhesive applied to a plasticized polyvinyl chloride backing or a polyethylene or rubber film backing. Electrical tape is used to insulate, hold, reinforce and protect electrical wires. Other uses include providing a matrix for varnish impregnation, identifying wires in electrical circuitry, and protecting terminals during manufacture of electrical circuit boards. Electrical tape, should be stretchable, conformable and meet nonflammability requirements.

Preformed pavement marking materials include pavement marking sheet materials and raised pavement markers that are used as highway and pedestrian crosswalk markings. They are often reflective and strategically oriented to enhance reflective efficiency when illuminated by vehicle headlamps at night. The marking materials must adhere to a variety of surfaces such as concrete or asphalt, that may be cold, hot, oily, damp, rough or smooth. Present pavement marking adhesive generally have inadequate initial bonding or inadequate permanent bonding to roadway surfaces that are illustrated by five problem areas: (1) limited adhesive tack at cold temperatures resulting in a narrow application window, (2) reduced durability under shear or impact causing difficult removal of temporary markings, (3) low molecular weight fractions in the adhesives on removable markings that stain light colored concrete surfaces, (4) limited ductility allowing raised markers to sometimes shatter upon impact by vehicle tires and (5) insufficient elasticity to fill in gaps between markers and rough road surfaces, thus often leading to premature detachment of the marker from the roadway surface.

Hot melt adhesives are compositions that can be used to bond nonadhereing surfaces together into a composite. During application to a substrate, hot melt adhesives should be sufficiently fluid to wet the surface completely and leave no voids, even if the surface is rough. Consequently, the adhesive must be low in viscosity at the time of application. However, the bonding adhesive generally sets into a solid to develop sufficient cohesive strength to remain adhered to the substrate under stressful conditions.

For hot melt adhesives, the transition from fluid to solid may be accomplished in several ways. First, the hot melt adhesive may be thermoplastic that softens and melts when heated and becomes hard again when cooled. Such heating results in sufficiently high fluidity to achieve successful wetting. Alternatively, the hot melt adhesive may be dissolved in a solvent or carrier that lowers the viscosity of the adhesive sufficiently to permit satisfactory wetting and raised the adhesive viscosity when the solvent or carrier is removed. Such an adhesive can be heat activated, if necessary.

Damping is the dissipation of mechanical energy as heat by a material in contact with the source of that energy. The temperature range and frequency range over which damping occurs can be quite broad, depending upon the particular application. For instance, for damping in tall buildings that experience wind sway or seismic vibrations, the frequency range can go to as low as about 0.1 Hertz (Hz) up to about 10 Hz. Higher frequency damping applications can be those such as for computer disk drives (on the order of 1000 Hz) or higher frequency applications (10,000 Hz). Furthermore, outdoor damping applications can be exposed to a wide range of temperature and humidity conditions.

While the performance of a surface layer damping treatment depends largely on the dynamic properties of the viscoelastic material, it is also dependent on other parameters. The geometry, stiffness, mass, and mode shape of the combination of the damping material and the structure to which it is applied will affect the performance of the damping material.

Presently known viscoelastic materials consist of single components or polymer blends. Since presently known single component viscoelastic materials perform over fairly narrow temperature ranges, conventional solutions to wide temperature variations incorporate multiple layers of viscoelastic material, with each layer being optimized for a different temperature range.

SUMMARY OF THE INVENTION

Briefly, in one aspect of the present invention, polydiorganicsiloxane oligourea segmented copolymers are provided wherein such copolymers comprise (a) soft polydiorganosiloxane diamine units, hard polyisocyanate residue units, wherein the polyisocyanate residue is the polyisocyanate minus the —NCO groups, optionally, soft and/or hard organic polyamine units, wherein the residues of isocyanate units and amine units are connected by urea linkages, and terminal groups, wherein the terminal groups are functional endcapping groups, and (b) silicate resins. The composition may also optionally contain free radical initiators, silane crosslinking agents, moisture cure catalysts, and nonreactive additives such as fillers, pigments, stabilizers, antioxidants, flame retardants, plasticizers, compatibilizers and the like.

The compositions of the present invention are particularly useful as pressure sensitive adhesives and in one aspect of the present invention, a curable pressure sensitive adhesive composition is provided comprising (a) polydiorganosiloxane oligourea segmented copolymer comprising alternating soft polydiorganosiloxane units and hard polyisocyanate residue units, wherein the residue units are polyisocyanate units minus the —NCO groups, and optionally, soft and/or hard organic polyamine units, wherein the residues of isocyanate units and amine units are connected together by urea linkages and the copolymer has functional terminal groups, and (b) silicate resins.

In another aspect of the present invention, the pressure sensitive adhesives (PSAs) can be used to fabricate PSA articles, wherein the PSA articles comprise a flexible substrate and a layer of PSA prepared in accordance with the present invention. Furthermore, the substrate may be any substrate that would be known to those skilled in the art and may further be coated or treated to provide a low energy release surface on one surface (typical, the backside surface), such as coating with a low adhesion backsize, a release coating and the like, such that the PSA article could be rolled up on itself like a conventional roll of tape. Alternatively, the substrate may be treated or coated with additional layers to provide a tie layer, a primer layer, a barrier layer and the like between the substrate and the adhesive layer.

The present invention further provides vibration damping compositions comprising (a) a curable polydiorganosiloxane oligourea segmented copolymer comprising alternating soft polydiorganosiloxane units, and optionally soft and/or hard organic polyamine units and hard polyisocyanate residue units, wherein the residue units are polyisocyanate units minus the —NCO groups, such that the residues of isocyanate units and amine units are connected together by urea linkages, and the copolymer has functional terminal groups, and (b) silicate resin.

Additionally, the compositions of the present invention are particularly useful as hot melt adhesives and in one aspect of the present invention, a curable hot melt adhesive composition is provided comprising (a) polydiorganosiloxane oligourea segmented copolymer comprising alternating soft polydiorganosiloxane units and hard polyisocyanate residue units, wherein the residue units are polyisocyanate units minus the —NCO groups, such that the hard units and the soft units are connected together by urea linkages and the copolymer has functional terminal groups, and (b) silicate resins.

In another aspect of the present invention, the hot melt adhesives can be used to prepared rods, sheets, pellets and the like that can be subsequently applied in a molten state to produce an adhesive bond between different substrates. The substrate may be any substrate that would be known to those skilled in the art and would be especially useful in adhering low surface energy materials and electronic components.

The present invention also provides a vibration damping composite comprising at least one substrate and at least one layer of the composition of the present invention The substrate may be flexible, stiff, or rigid. Furthermore, the substrate may be any substrate that would be known to those skilled in the art and may further be coated or treated to provide a low energy release surface, such as a coating with a low adhesion backsize, a release coating and the like.

Such composites may be a constrained layer construction, wherein the construction comprises at least one substrate having a stiffness sufficient to cause resonation within the substrate in response to an internal or external applied force and at least one layer of the composition of the present invention. The constrained layer construction preferably has a composite loss factor, tan δ greater than or equal to 0.4 in the temperature range of between about −80 and 150° C. and in the frequency range of 0.01 to 100,000 Hz as evaluated by a Polymer Laboratories Dynamic Mechanical Thermal Analyzer Mark II in the shear mode. The useful temperature range depends on both the frequency and the characteristics of the damping composition.

In another aspect, the composite article construction may be such to provide a bi-directional vibration damping constrained layer construction comprising at least two rigid members, and at least one layer of the composition of the present invention. Generally, each rigid member has a stiffness exceeding that of a 0.25 cm steel plate. Preferably, the vibration damping composition has a tan δ greater than or equal to 0.4 in the temperature range of −80° C. and 150° C. and in the frequency range of 0.1 to 10 Hz, as evaluated by a Polymer Laboratories Dynamic Mechanical Thermal Analyzer Mark II in the shear mode.

Advantageously, shaped articles can be produced, for example, by techniques such as compression molding, injection molding, casting, calendaring and extrusion. Curing can be provided by techniques common for free radical or moisture cure crosslinking reactions.

The compositions of the present invention have excellent physical properties typically associated with polydiorganosiloxane polymers such as moderate thermal and oxidative stabilities, UV resistance, low index of refraction, low surface energy, and hydrophobicity, resistance to degradation from exposure to heat, and water, good dielectric properties, good adhesion to low surface energy substrates, and flexibility at low temperatures. In addition, the compositions exhibit a combination of unexpected properties including, for example, excellent green strength, that is, mechanical strength in the uncured state, allowing subsequent operations to contact the surface before the compositions have cured, controlled flow and crosslinked density characteristics permitting thick coatings on irregular surfaces, good conformability to irregular surfaces, excellent mechanical properties typical of curable systems, excellent damping performance over a broad temperature range, an ability to withstand large strains, excellent adhesion to a variety of substrates when formulated for adhesion, and handling characteristics that permit easy attainment of desired thicknesses and shapes. Furthermore, the compositions can be cured at room temperature, thus permitting use of temperature sensitive substrates.

The compositions of the invention have good resistance to environmental conditions and good performance over a broad range of frequency and temperature. When used as vibration damping materials, the compositions of the present invention have wide utility for minimizing adverse vibration in constrained layer damping treatments as well as minimizing adverse wind sway and seismic influences in buildings subject to wide temperature and humidity variations.

The present invention further provides a process for producing curable compositions comprising (a) forming a polydiorganosiloxane oligourea segmented copolymer by adding at least one polyisocyanate and at least one endcapping agent that has end groups that are reactive under free radical or moisture cure conditions to an organic solvent solution of at least one polyamine, wherein the polyamine is at least one polydiorganosiloxane diamine or a mixture of at least one diorganosiloxane diamine and at least one organic polyamine, mixing the solution and allowing the polyisocyanate, endcapping agents, and polyamine to react to form a polydiorganosiloxane oligourea segmented copolymer, (b) blending the polydiorganosiloxane oligourea segmented copolymer solution with at least one silicate resin, and (c) removing the organic solvent.

The present invention still further provides a process for preparing curable compositions comprising the steps of continuously providing reactants, wherein the reactants comprise at least one polyisocyanate, at least one polyamine, and at least one endcapping agent to a reactor; mixing the reactants in the reactor; allowing the reactants to react under substantially solvent free conditions to form a polydiorganosiloxane oligourea segmented copolymer; conveying the copolymer from the reactor; providing the copolymer, at least one silicate tackifying resin, and solvent to a second reactor; mixing the copolymer, the silicate tackifying resin, and the solvent in the second reactor to form a tackified composition; and conveying the tackified composition from the second reactor.

The present invention still further provides an essentially solventless process for producing curable compositions comprising (a) forming polydiorganosiloxane oligourea segmented copolymer by continuously providing reactants, wherein the reactants comprise at least one polyisocyanate, at least one endcapping agent that has end groups that are reactive under free radical or moisture cure conditions, and at least one polyamine to a reactor, mixing the reactants in the reactor, allowing the reactants to react to form a polydiorganosiloxane oligourea copolymer, and conveying polymer from the reactor and (b) incorporating a silicate resin by blending the silicate resin with reactants or the polydiorganosiloxane oligourea segmented copolymer.

This solventless process is environmentally advantageous as there are no solvents to be evaporated from the final composition. The continuous nature of this process has several other inherent advantages over conventional solution polymerization processes. The material can be extruded into a variety of shapes immediately subsequent to polymerization which obviates the degradation, which may be associated with additional heat from further reprocessing steps. Another advantage of this substantially solventless, continuous process is the ability to add or blend, in line, the silicate resin, as well as various free radical initiators, silane crosslinking agents, moisture cure catalysts, and nonreactive fillers, plasticizers other polymers, and other property modifiers into the polydiorganosiloxane oligourea segmented copolymer before, during, or after formation of the copolymer.

Optionally, nonreactive additives such as fillers, plasticizers, pigments, stabilizers, antioxidants, flame retardants, compatibilizers and the like may be added at any point in each of the above processes.

Each process of the present invention has unique advantages. The solvent process permits the use of conventional solvent coating equipment while resulting in curable tackified compositions whose high green strength, i.e., strength prior to curing, permits subsequent manufacturing operations before cure. The solventless process permits thick coatings onto irregularly shaped surfaces, use of conventional hot melt coating equipment with lower processing temperatures than typically used with conventional hot melt processable compositions, the advantage associated with high green strength, as well as many advantages involving the environment, economics, and safety that are associated with a substantially solventless process. The combination of elements of each process permits one to customize the silicate tackifying resin concentration at a later date for specific applications while retaining some of the advantages of each.

DESCRIPTION OF THE PREFERRED EMBODIMENT(S)

Figure 1:
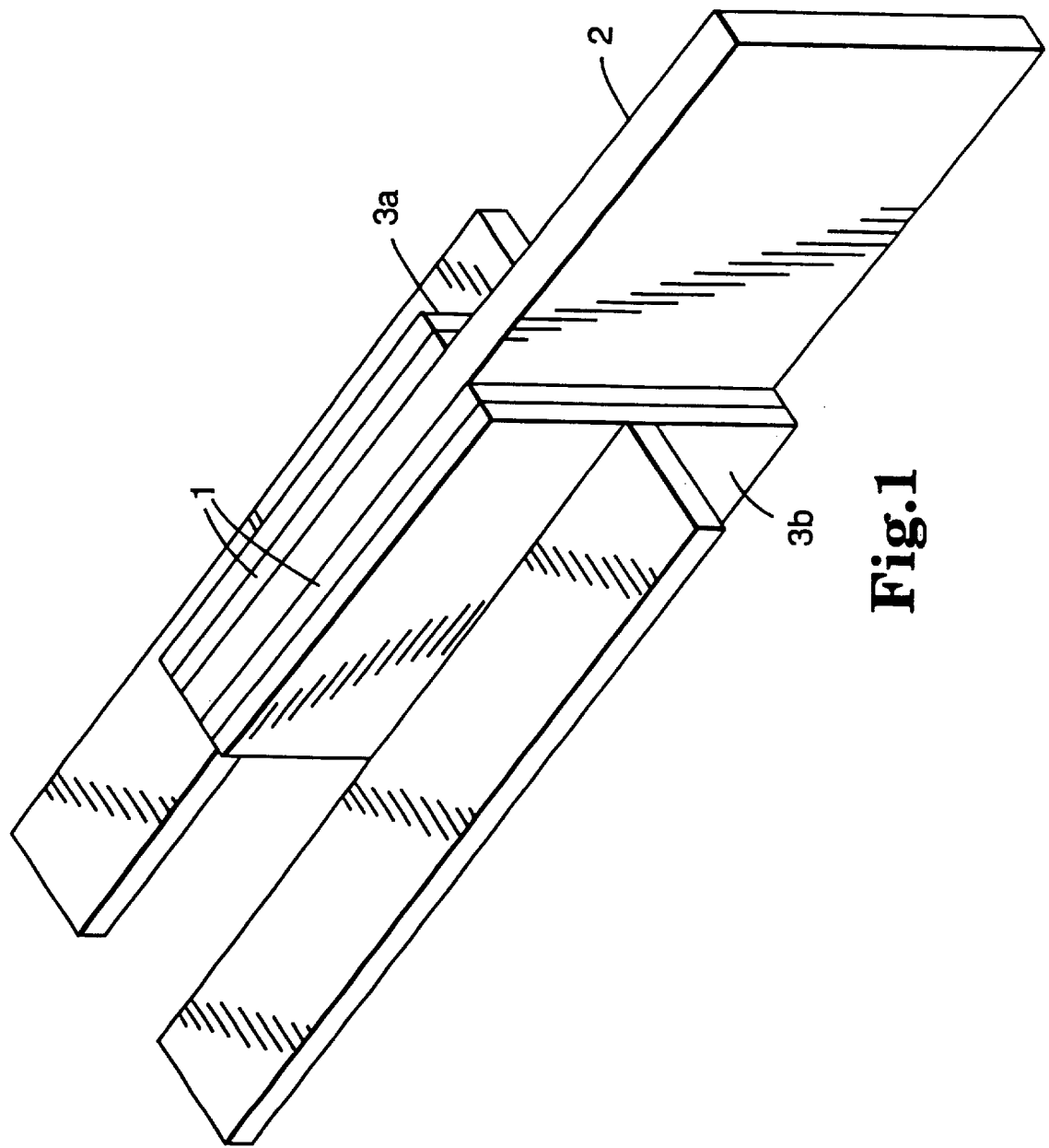
FIG. 1 is a perspective view of a bi-directional vibration damper of the present invention.

The polydiorganosiloxane oligourea segmented copolymers useful in the curable tackified compositions of the present invention can be represented by the formula

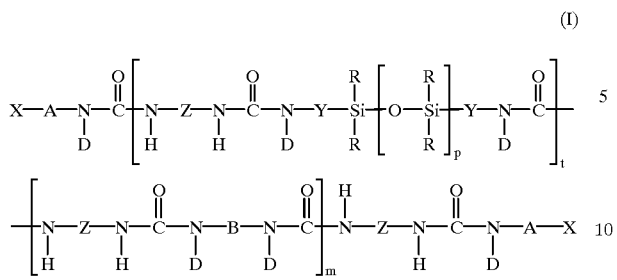

(I)

wherein:
each R is a monovalent moiety which independently is an alkyl moiety preferably having about 1 to 12 carbon atoms, and which may be substituted with, for example, trifluoroalkyl or vinyl groups, a vinyl radical or higher alkenyl radical represented by the formula —$R^2(CH_2)_aCH=CH_2$ wherein $R^2$ is —$(CH_2)_b$— or —$(CH_2)_cCH=CH$— and a is 1, 2 or 3; b is 0, 3 or 6; and c is 3, 4 or 5, a cycloalkyl moiety preferably having about 6 to 12 carbon atoms and which may be substituted with alkyl, fluoroalkyl, and vinyl groups, or an aryl moiety preferably having about 6 to 20 carbon atoms and which may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroether-containing group, as described in U.S. Pat. No. 4,900,474 and U.S. Pat. No. 5,118,775, wherein such descriptions are incorporated herein by reference; preferably at least 50% of the R moieties are methyl radicals with the balance being monovalent alkyl or substituted alkyl radicals preferably having 1 to 12 carbon atoms, vinylene radicals, phenyl radicals, or substituted phenyl radicals or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a polyperfluoroether-containing group, as described in U.S. Pat. No. 4,900,474 and U.S. Pat. No. 5,118,775, wherein such descriptions are incorporated herein by reference.;

each Z is a polyvalent radical which is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, and mixtures thereof;

each Y is a divalent moiety which independently is an alkylene radical preferably having 1 to 10 carbon atoms, an aralkylene radical or an arylene radical preferably having 6 to 20 carbon atoms;

each A is independently —B—, or —$YSi(R)_2(OSi(R)_2)_pY$— or mixtures thereof,

B is a polyvalent radical selected from the group consisting of alkylene, aralkylene, cycloalkylene, phenylene, polyalkylene oxide, such as, polyethylene oxide, polypropylene oxide, polytetramethylene oxide, and copolymers thereof, and mixtures thereof, each D is a monovalent radical which independently is hydrogen, an alkyl radical preferably having 1 to 10 carbon atoms or an aryl or arylalkyl radicals preferably having about 6 to 20 carbon atoms;

each X is a moiety represented by the formula
(a) a moiety represented by

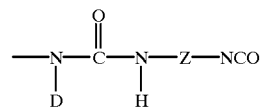

(II)

where each of D, and Z are defined as above, or
(b) a moiety represented by

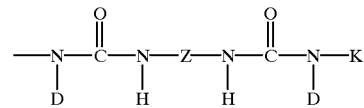

(III)

where each of Z and D are defined as above,
K is independently (i) a free radical polymerizable end group such as, for example acrylate, methacrylate, acrylamido, methacrylamido and vinyl groups; (ii) a moisture curable group such as, for example, alkoxysilane and oximino silane groups, and (c) a moiety represented by

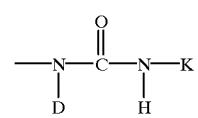

(IV)

wherein D and K are defined as above.
(d) a moiety represented by

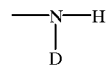

(V)

m is about 0 to 8;
p is about 10 or larger, preferably about 15 to 2000, more preferably about 30 to 1500; and
t is a about 1 to 12, preferably about 1 to 6, more preferably about 1 to 4.

In the use of polyisocyanates (Z is a radical having a functionality greater than 2) and polyamines (B is a radical having functionality greater than 2), the structure of Formula I will be modified to reflect branching at the polymer backbone.

The average degree of polymerization refers to the size of the resultant oligomer molecule and is determined from the number average of the residue of amine-containing reactant molecules in the oligomer. There are two ways of obtaining the desired degree of oligomerization: (1) control the isocyanate to amine ratio to obtain either isocyanate or amine endcapped oligomer (X=a or d), and (2) judiciously select the amount of monoamine or monoisocyanate endcapper with stoichiometric amounts of isocyanate and amine (X=b or c). The following table displays the mol ratios of the various molecules necessary for building a molecule with the desired encapper "X". For the use of polyamines and polyisocyanates, the ratios may be adjusted accordingly.

|  | X(a) | X(b) | X(c) | X(d) |
|---|---|---|---|---|
| Degree of oligomerization | t + m + 2 | t + m + 4 | t + m + 2 | t + m + 2 |
| Diamines | t + m + 2 | t + m + 2 | t + m + 2 | t + m + 2 |
| Diisocyanates | t + m + 3 | t + m + 3 | t + m + 1 | t + m + 1 |
| Monoamines | — | 2 | — | — |
| Monoisocyanates | — | — | 2 | — |

Polydiorganosiloxane diamines useful in the process of the present invention can be represented by the formula

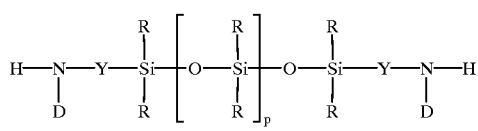

(VI)

wherein each of R, Y, D, and p are defined as above. Generally, the number average molecular weight of the polydiorganosiloxane diamines most useful in the present invention range from about 700 to 150,000 or more.

Polydiorganosiloxane diamines (also referred to as silicone diamines or diamines) useful in the present invention are any which fall within Formula V above and include those having molecular weights in the range of about 700 to 150,000. Polydiorganosiloxane diamines are described, for example, in U.S. Pat. Nos. 5,026,890 and 5,276,122, wherein such descriptions are incorporated by reference herein and JP 93087088. Preferred are substantially pure polydiorganosiloxane diamines prepared as described in U.S. Pat. No. 5,214,119, wherein such description is incorporated herein by reference. The polydiorganosiloxane diamines having such high purity are prepared from the reaction of cyclic organosiloxanes and bis(aminoalkyl) disiloxanes utilizing an anhydrous aminoalkyl functional silanolate catalyst such as tetramethylammonium 3-aminopropyldimethylsilanolate, preferably in an amount less than 0.15 weight percent based on the weight of the total amount of cyclic organosiloxane with the reaction run in two stages.

Particularly preferred are polydiorganosiloxane diamines prepared using cesium and rubidium catalysts. The preparation includes combining under reaction conditions (1) an amine functional endblocker represented by the formula

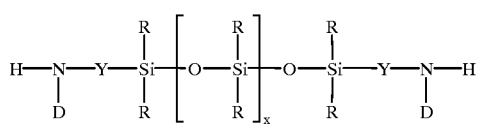

(VII)

wherein each R, D, and Y are described as above and x is an integer of about 0 to 150;

(2) sufficient cyclic siloxane to obtain a polydiorganosiloxane diamine having a molecular weight greater than the molecular weight of the endblocker and (3) a catalytic amount of cesium hydroxide, rubidium hydroxide, cesium silanolate, rubidium silanolate, cesium polysiloxanolate, rubidium polysiloxanolate, and mixtures thereof.

The reaction is continued until substantially all of the amine functional endblocker is consumed. Then the reaction is terminated by adding a volatile organic acid to form a mixture of a polydiorganosiloxane diamine usually having greater than about 0.01 weight percent silanol impurities and one or more of the following: a cesium salt of the organic acid, a rubidium salt of the organic acid, or both such that there is a small molar excess of organic acid in relation to catalyst. Then, the silanol groups of the reaction product are condensed under reaction conditions to form polydiorganosiloxane diamine having less than or equal to about 0.01 weight percent silanol impurities while the unreacted cyclic siloxane is stripped, and, optionally, the salt is removed by subsequent filtration.

Examples of polydiorganosiloxane diamines useful in the present invention include polydimethylsiloxane diamine, polydiphenylsiloxane diamine, polytrifluoropropylmethylsiloxane diamine, polyphenylmethylsiloxane diamine, poly(5-hexenyl)methylsiloxane diamine, polydiethylsiloxane diamine, polydivinylsiloxane diamine, polyvinylmethylsiloxane diamine, copolymers thereof and mixtures thereof.

Any polyisocyanate that can react with a monoamine or a polyamine can be used in the present invention. Particularly useful polyisocyanates are diisocyanates and are those that are represented by the formula

(VIII)

where Z is defined as above.

Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5trimethylcyclohexyl isocyanate (isophorone diisocyanate) and cyclohexylene-1,4-diisocyanate.

Preferred diisocyanates include 2,6-toluene diisocyanate, methylenediphenylene-4,4'-diisocyanate, polycarbodiimide-modified methylenediphenyl diisocyanate, o-dianisidine diisocyanate, tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, and cyclohexylene-1,4-diisocyanate.

Any triisocyanate that can react with the polyamine, and in particular with the polydiorganosiloxane diamine of Formula VI, can be used in the present invention. Examples of such triisocyanates include, but are not limited to, polyfunctional isocyanates, such as those produced from biurets, isocyanurates, adducts and the like may be used. Some commercially available polyisocyanates include portions of the DESMODUR™ and MONDUR™ series from Bayer and the PAPI™ series from Dow Plastics. Preferred triisocyanates include DESMODUR™ N-3300 and MONDUR™ 489.

The use of different polyisocyanates in the reaction will modify the properties of the polydiorganosiloxane polyurea segmented copolymer, thus affecting the rheological and mechanical properties of the resulting compositions.

The endcapping agents contain free radically curable groups, moisture curable groups, or a mixture thereof depending on the properties desired in the resulting polydiorganosiloxane oligourea segmented copolymer materials. Preferred endcapping agents are governed by their costs and availability, and the specific properties desired, and thus may vary with time.

Suitable endcapping agents for polydiorganosiloxane oligourea segmented copolymers which would be terminated with amine groups, were no endcapping agent present and which provide end groups which are reactive under free radical curing conditions, include but are not limited to isocyanatoethyl methacrylate, alkenyl azlactones such as vinyl dimethyl azlactone and isopropenyl dimethyl azlactone, m-isopropenyl-α,α-dimethyl benzyl isocyanate, and acryloyl ethyl carbonic anhydride. Some of these endcapping agents, e.g., isocyanatoethyl methacrylate, are commercially available, and others can be prepared using procedures well-known to those skilled in the art. Alkenyl azlactones and their preparations are described in U.S. Pat. No. 4,777,276, wherein such description is incorporated herein by reference. Acryloyl ethyl carbonic anhydride can be prepared from ethyl chloroformate and acrylic acid by the method of R. Hatada and H. Kondo given in *Bull. Chem. Soc, Japan*, 41 (10), 2521(1968). Preferred endcapping agents, for polydiorganosiloxane oligourea segmented copolymers that would be amine terminated if no endcapping agent were present includes, for example, isocyanatoethyl methacrylate, vinyl dimethyl azlactone, and acryloyl ethyl carbonic anhydride.

Suitable endcapping agents for polydiorganosiloxane oligourea segmented copolymers which would be terminated with amine groups were no end capping agent present, with end groups which are reactive under moisture curing conditions include but are not limited to isocyanatopropyl trimethoxysilane, isocyanatopropyl triethoxysilane, isocyanatopropyl dimethoxy (methylethylketoximino)silane, isocyanatopropyl diethoxy (methylethylketoximino)silane, isocyanatopropyl monomethoxy di(methylethylketoximino) silane, isocyanatopropyl monoethoxy di(methylethylketoximino)silane, and isocyanatopropyl tri (methylethylketoximino)silane. The diisocyanate which serves to form the copolymer, may also serve as the moisture curable terminal portion of the copolymer when the isocyanate groups provided by the diisocyanate exceed the amine groups provided by the diamine.

Suitable endcapping agents for polydiorganosiloxane oligourea segmented copolymers where the copolymer would be isocyanate terminated if no endcapping agent were present, which provide end groups which are reactive under moisture curing conditions include but are not limited to aminopropyl trimethoxysilane, aminopropyl triethoxysilane, aminopropyl methyldimethoxysilane, aminopropyl methyldiethoxysilane, aminopropyl dimethoxy (methylethylketoximino)silane, aminopropyl diethoxy (methylethylketoximino)silane, aminopropyl monomethoxy di(methylethylketoximino)silane, aminopropyl monoethoxy di(methylethylketoximino)silane, and aminopropyl tri (methylethylketoximino)silane. Preferred endcapping agents, for polydiorganosiloxane oligourea segmented copolymers where the copolymer would be isocyanate terminated if no endcapping agent were present, include, for example, aminopropyl trimethoxysilane, aminopropyl triethoxysilane and aminopropyl methyldiethoxysilane.

Examples of organic polyamines useful in the present invention include but are not limited to polyoxyalkylene diamine, such as D-230, D-400, D-2000, D-4000, DU-700, ED-2001 and EDR-148, all available from Huntsman, polyoxyalkylene triamine, such as T-3000 and T-5000 available from Huntsman, polyalkylenes, such as Dytek A and Dytek EP, available from DuPont.

The above polyamines, polyisocyanates, and endcapping agents are used in the appropriate stoichiometric ratios to obtain curable polydiorganosiloxane oligourea segmented copolymers with the desired average degree of polymerization.

The silicate resin plays an important role in determining the physical properties of the compositions of the present invention. For example, as silicate resin content is increased from low to high concentration, the glassy to rubbery transition occurs at increasingly higher temperatures. Thus, varying silicate resin concentration in vibration damping applications can shift the area of maximum damping to the desired temperature range. Of course, the M to Q ratio, D and T content and molecular weight of the resins may significantly influence the relative "hardness" of the resin and must be considered when selecting resin type and concentration. Furthermore, one need not be limited to a single silicate resin as it may be beneficial to employ a combination of resins in a single damping composition to achieve desired damping performance.

Silicate resins useful in the present invention include those composed of the following structural units, M, D, T, Q and combinations thereof. For example, MQ silicate resins, MQD silicate resins, and MQT silicate resins that also may be referred to as copolymeric silicate resins and that preferably have a number average molecular weight of about 100 to about 50,000, more preferably about 500 to about 10,000 and generally have methyl substituents. Silicate resins include both nonfunctional and functional resins, the functional resins having one or more functionalities including, for example, silicon-bonded hydrogen, silicon-bonded alkenyl, and silanol. MQ silicate resins are copolymeric silicate resins having $R'_3SiO_{1/2}$ units and $SiO_{4/2}$ units. Such resins are described in, for example, *Encyclopedia of Polymer Science aid Engineering*, vol. 15, John Wiley & Sons, New York, (1989), pp 265–270, and U.S. Pat. No. 2,676,182, U.S. Pat. No. 3,627,851, U.S. Pat. No. 3,772,247, and U.S. Pat. No. 5,248,739, which are incorporated herein by reference. MQ silicate resins having functional groups are described in U.S. Pat. No. 4,774,310 that has silyl hydride groups, U.S. Pat. No. 5,262,558 that has vinyl and trifluoropropyl groups, and U.S. Pat. No. 4,707,531 that has silyl hydride and vinyl groups, each of which is incorporated herein by reference. The above-described resins are generally prepared in solvent. Dried, or solventless, MQ silicate resins can be prepared as described in U.S. Pat. No. 5,319, 040, U.S. Pat. No. 5,302,685, and U.S. Pat. No. 4,935,484, each of which are incorporated herein by reference. MQD silicate resins are terpolymers having $R'_3SiO_{1/2}$ units, $SiO_{4/2}$ units, and $R'_2SiO_{2/2}$ units such as are taught in U.S. Pat. No.

2,736,721 which is incorporated herein by reference. MQT silicate resins are terpolymers having R'$_3$SiO$_{1/2}$ units, SiO$_{4/2}$ units and R'SiO$_{3/2}$ units such as are taught in U.S. Pat. No. 5,110,890 which is incorporated herein by reference and Japanese Kokai HE 2-36234.

Commercially available silicate resins include SR-545, MQ resin in toluene, available from General Electric Co., Silicone Resins Division, Waterford, N.Y.; MQOH resins which are MQ silicate resins in toluene, available from PCR, Inc., Gainesville, Fla.; MQR-32-1, MQR-32-2, and MQR-32-3 resins which are MQD resin in toluene, available from Shin-Etsu Chemical Co. Ltd., Torrance, Calif.; and PC-403, hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying, steam drying, etc. to provide a silicate resin at about 100% nonvolatile content for use in compositions of the present invention. Also useful in compositions of the present invention are blends of two or more silicate resins.

The compositions of the present invention preferably contains about 20 to 80 parts by weight polydiorganosiloxane oligourea segmented copolymer, more preferably about 25 to 75 parts by weight, most preferably about 30 to 70 parts by weight. The composition preferably contains about 20 to 80 parts by weight silicate resin, more preferably about 25 to 75 parts by weight, most preferably about 30 to 70 parts by weight. The total parts by weight of the polydiorganosiloxane polyurea segmented copolymer and the silicate resin equal 100.

Further, the compositions of the present invention may also optionally contain various free radical initiators, silane crosslinking agents, moisture cure catalysts, fillers, and other property modifiers that are not reactive to the amine or isocyanate groups and can also be blended into the compositions before, during, or after formation of the oligourea has taken place. Free radical initiators can be added in concentrations from 0.1 to 5.0 weight percent. Moisture cure crosslinking agents can be added in concentrations up to about 40 weight percent and moisture cure catalysts can be added in amounts up to about 10 weight percent to moisture curable tackified polydiorganosiloxane oligourea segmented copolymers to reduce the cure time.

Silane agents may be used to crosslink the moisture curable polysiloxane oligourea segmented copolymers of the present invention. Suitable silane crosslinking agents generally have the formula R"$_n$SiW$_{4-n}$ where R" is a monovalent hydrocarbon group, (for example, an alkyl, alkylenyl, aryl, or alkaryl group), n is 0, 1 or 2, and W is a monovalent hydrolyzable group such as a dialkylketoximino group, (for example, methylethylketoximino, dimethylketoximino, or diethylketoximino), alkoxy group (for example, methoxy, ethoxy, or butoxy), alkenoxy group (for example, isopropenoxy), acyloxy group (for example, acetoxy), alkamido group (for example, methylacetamido or ethylacetamido), acylamido group (for example, phthalimidoamido). Silane crosslinking agents falling within this category are commercially available, for example, from Silar Laboratories, Scotia, N.Y. Particularly preferred silane crosslinking agents are dialkylketoximinosilanes because they exhibit good shelf-stability and do not form deleterious by-products upon cure. Examples include methyltri(methylethylketoximino)silane and vinyltri(methylethylketoximino)silane, both of which are commercially available from Allied-Signal, Inc. Morristown, N.J., and alkoxysilanes available from OSi Chemicals, Lisle, Ill.

The free radically curable polydiorganosiloxane oligourea segmented copolymer compositions of the invention can, depending upon their viscosity, be coated, extruded, or poured, and rapidly, completely, and reliably radiation cured to tackified materials (even at high molecular weight) by exposure to electron beam, visible or ultraviolet radiation. Curing is preferably carried out in as oxygen-free an environment as possible, e.g., in an inert atmosphere such as nitrogen gas or by utilizing a barrier of radiation-transparent material having low oxygen permeability. Curing can also be carried out under an inerting fluid such as water. When visible or ultraviolet radiation is used for curing, the silicone compositions may also contain photoinitiator. Suitable photoinitiators include benzoin ethers, benzophenone and derivatives thereof, acetophenone derivatives, camphorquinone, and the like. Photoinitiator is generally used at a concentration of from about 0.1% to about 5% by weight of the total polymerizable composition, and, if curing is carried out under an inerting fluid, the fluid is preferably saturated with the photoinitiator or photoinitiators being utilized in order to avoid the leaching of initiator from the silicone composition. The rapid cure observed for these materials allows for the use of very low levels of photoinitiator, thereby achieving a uniform cure of thick sections. If desired, the silicone compositions of this invention can also be cured thermally, requiring the use of thermal initiator such as peroxides, azo compounds, or persulfates generally at a concentration of from about 1% to about 5% by weight of the total polymerizable composition. It is preferable that any thermal or photo-initiator used be soluble in the silicone compositions themselves, requiring no use of solvent.

Examples of suitable curing catalysts for moisture curable polydiorganosiloxane oligourea segmented copolymers include alkyl tin derivatives (e.g., dibutyltindilaurate, dibutyltindiacetate, and dibutyltindioctoate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). In general, however, it is preferred to select silane crosslinking agents that do not require the use of curing catalysts to avoid reducing shelf-life and adversely affecting the physical properties of the vibration damping composition.

Other catalysts useful for moisture curable polydiorganosiloxane oligourea segmented copolymers include acids, anhydrides, and lower alkyl ammonium salts thereof which include but are not limited to those selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

Also useful for curing compositions of this invention are the well known two component room temperature free radical curatives consisting of a polymerization catalyst and an accelerator. Common polymerization catalysts useful in this two component curative include organic peroxides and hydroperoxides such as dibenzoyl peroxide, t-butyl hydroperoxide, and cumene hydroperoxide, that are not active at room temperature in the absence of an accelerator. The accelerator component of the curative consists of the condensation reaction product of a primary or secondary amine and an aldehyde. Common accelerators of this type are butyraldehyde-aniline and butyraldehyde-butylamine condensation products sold by E.I. duPont de Nemours & Co. as Accelerator 808™ and Accelerator 833™. This catalyst system may be employed to prepare a two-part free radically curable organosiloxane oligourea segmented copolymer where the curable copolymer is divided into two parts and to one part is added the polymerization catalyst and to the other part is added the accelerator. Upon mixing this two component system cures at room temperature. Alternatively, the polymerization catalyst can be incorporated in the free radically curable polyorganosiloxane oligourea segmented copolymer and the accelerator can be applied to a substrate such that when the free radically curable organosiloxane oligourea segmented copolymer containing polymerization catalyst contacts the "primed" substrate surface, cure proceeds immediately at room temperature. Those of ordinary skill in the art are familiar with such cure systems and could readily adapt them to various product constructions.

Suitable fillers include those such as fumed silica, carbon fibers, carbon black, glass beads, glass bubbles, glass fibers, mineral fibers, clay particles, organic fibers, e.g., nylon, polyimide, e.g., KEVLAR™, available from DuPont Co., and the like, metal particles, and the like which can be added in amounts of from about 5 to 50 parts per 100 parts of polydiorganosiloxane oligourea segmented polymer and silicate resin. Other additives such as dyes, pigments, thermal conductors such as alumina, boron nitride, aluminum nitride, nickel particles, flame retardants, stabilizers, antioxidants, compatibilizers, and the like can be blended into these systems in amounts of from about 1 to 50 volume percent of the composition.

The compositions of the invention can be made by a solution process, a solventless process or a combination of the solventless and the solution process. In each process, the compositions of the present invention are prepared from the reaction of mixtures of polyamines, polyisocyanates and endcapping agents in stoichiometric amounts to obtain curable polydiorganosiloxane oligourea segmented copolymers with desired degrees of polymerization, for example, from about 2 to 12, and the mixture of these copolymers with silicate resins to form curable polydiorganosiloxane oligourea segmented copolymer materials useful as pressure sensitive adhesives, vibration damping materials and/or hot melt adhesives. Also in each process, initiators, cure catalysts and/or crosslinking agents may be optionally added at any time during the process to enhance the cure rate of chemically curable forms of the invention. Generally these materials are not reactive until exposure to some predetermined set of conditions, that is, radiation, heat, and/or moisture. Depending on the situation, any one of the three processes may be preferred.

In the solvent process, the substantially nonreactive silicate resin can be introduced before, during, or after the polyamines, polyisocyanates and endcapping agents have been introduced. Preferably the silicate resin is added after the three reactants have formed a curable polydiorganosiloxane oligourea segmented copolymer. The reaction of the polyamines and polyisocyanates is carried out in a dry solvent, or mixtures of solvents, protected from atmospheric moisture. The solvents are preferably unreactive with the polyamines, polyisocyanates and endcapping agents. The starting materials and final products preferably remain completely miscible in the solvents during and after the completion of the polymerization. Suitable solvents include polar liquids, such as alcohols, esters, aromatic hydrocarbons, and chlorinated hydrocarbons, with tetrahydrofuran, toluene and isopropylalcohol and methylene chloride being especially useful. In synthesizing polydiorganosiloxane oligourea segmented copolymers with isocyanate-functional end groups, it is necessary to add the polyamine to a solution of polyisocyanates so that the excess of the polyisocyanate with respect to the polyamine is maintained.

These reactions can be conducted at room temperature or up to the boiling point of the reaction solvent. The reaction is preferably carried out at ambient temperature up to 50° C.

In the substantially solventless process of the present invention, the polyamines, the polyisocyanates, the endcapping agents, the optional free radical initiators or moisture cure catalysts, and the silicate resin are mixed in a reactor and the reactants are allowed to react to form the substantially linear polydiorganosiloxane oligourea segmented copolymer which, with the silicate resin, and, optionally, when cured, forms the tackified composition of the invention.

The macromolecular size and architecture of the curable or cured polydiorganosiloxane oligourea segmented copolymer can influence properties such as shear strength, modulus, elongation and tack. One skilled in the art can expect the optimum polydiorganosiloxane oligourea segmented copolymer for the composition of the invention for a particular application to be a function of polyamine architecture, polyisocyanate, endcapping agents, plasticizers, fillers and additives, cure type, mixing rate, temperature, reactor throughput, reactor configuration and size, residence time, residence time distribution, and extent of cure. This process permits variations in the molecular weight and architecture of the polydiorganosiloxane oligourea segmented copolymer over a wide range, thus enabling one to tailor the properties of the compositions of the present invention to suit a variety of applications, such as for use as a vibration damping material or a pressure sensitive adhesive or as hot melt adhesives.

While the solvent process and the continuous solventless process for making polydiorganosiloxane oligourea segmented copolymer materials have advantages, some situations may occur where a combination of the solvent and solventless processes is preferred. In this third process, polydiorganosiloxane polyurea segmented copolymer is made by the continuous solventless process and subsequently mixed in solvent with the silicate resin solution, and optional filler, plasticizer free radical initiator, moisture cure catalyst, and silane crosslinking components.

In all three processes, the viscosity of the resulting tackified compositions can be modified to obtain a viscosity appropriate for the contemplated application and the coating method to be used. For good coatability, the compositions utilized in the invention typically has a viscosity of about 5 to about $10^4$ poise at processing temperatures. For the lower viscosities, conventional coating methods such as knife coating, spray coating, and roll coating can be used. At higher viscosities (that is, above 100 poise) the compositions can be extruded, die coated and knife coated.

Any reactor that can provide intimate mixing of the polyamine, polyisocyanate, endcapping agent and the reaction product thereof is suitable for use in the invention. The process is continuous using, for example a pin mixer, or a single or twin screw extruder. Preferably, the reactor is a wiped surface counter-rotating or co-rotating twin screw extruder.

The temperature in the reactor should be sufficient to permit the chain extension reaction between the polyisocyanate, the polyamine, and endcapping agent to occur. The temperature should also be sufficient to permit conveying of the materials through the reactor, and any subsequent processing equipment such as, for example, feedblocks and dies. For conveying the reacted material, the temperature preferably is in the range of about 20 to 250° C., more preferably in the range of about 40 to 180° C. Residence time in the reactor preferably varies from about 5 seconds to 8 minutes, more preferably from about 15 seconds to 3 minutes.

The residence time depends on several parameters, including, for example the length to diameter ratio of the reactor, mixing rates, overall flowrates, reactants, and the need to blend in additional materials. For materials involving minimal or no blending of a non-reactive component, the reaction can easily take place in as little as 5:1 length to diameter units of a twin screw extruder.

When a wiped surface reactor is used, it preferably has relatively close clearances between the screw flight lands and the barrel, with this value typically lying between 0.1 and 2 mm. The screws utilized are preferably fully or partially intermeshing or fully wiped in the zones where a substantial portion of the reaction takes place.

Generally, chemical species that are substantially unreactive with one another can be mixed together before introduction into the reactor to simplify the process. Examples include mixing a polyisocyanate with an endcapping monoisocyanate and optionally a cure catalyst; a polyamine with a cure catalyst, a polyamine with an endcapping monoamine, a polydiorganosiloxane diamine with an organic polyamine, and optionally a cure catalyst or suitable combinations thereof.

Because of the rapid reaction that occurs between amines and isocyanates, the reactants are preferably fed into an extruder at unvarying rates, particularly when using higher molecular weight polydiorganosiloxane diamines, i.e., with molecular weight of about 50,000 and higher. Such feeding generally reduces undesirable variability of the final product.

One method of insuring the continuous feeding of the very low flow polyisocyanate, endcapping agent, and/or cure catalyst streams in an extruder is to allow the feed line(s) to touch or very nearly touch the passing threads of the screws. Another method utilizes a continuous spray injection device which produces a continuous stream of fine droplets of these materials into the reactor.

The low flow materials such as polyisocyanate, isocyanate-endcapping agent, and/or cure catalyst stream(s) can be added into the reactor in a manner such as mentioned above before the polyamine if the reactor is capable of conveying this stream in a continuous and unvarying manner. The polyamine can then be added downstream in the reactor. Alternatively, the polyisocyanate, isocyanate endcapping agent, and/or cure catalyst stream(s) can also be added after the polyamine has been introduced into the reactor.

The silicate resin that is blended with the polydiorganosiloxane oligourea segmented copolymer and the optional fillers, free radical initiators, moisture cure catalysts and silane crosslinking agents, or other materials that are essentially non-reactive with the polydiorganosiloxane oligourea segmented copolymer, can be added further downstream in the reactor after a substantial portion of the reaction of the polyamine(s) and polyisocyanate(s) has taken place. Another suitable order of addition is addition of the polyamine first, the silicate resin and the other non-reactive materials second, and the polyisocyanate(s) third, with the polyisocyanate(s) fed in a continuous manner. If the silicate resin can be conveyed in the reactor, it can be added into the reactor first with the polyamine and polyisocyanate following separately at later stages in the process in any order that provides continuous and unvarying conveying of each component.

In one embodiment, the compositions of the present invention may be utilized as vibration damping materials alone, that is, free layer treatment, or in conjunction with a stiff layer, i.e., as part of a constrained-layer treatment. Vibration damping materials are most efficiently used if they are sandwiched between the structure/device to be damped and a relatively stiff layer, such as thin sheet metal. This forces the viscoelastic material to be deformed in shear as the panel vibrates, dissipating substantially more energy than when the material deforms in extension and compression as occurs in a free layer treatment. Preferably, constrained-layer constructions consist of a laminate of one or more stiff layers and one or more layers of the vibration damping material.

For damping applications, it is further desirable that the damping material, generally termed a viscoelastic material, have the following properties: damping capabilities at high temperatures, e.g., at 50° C. and above; damping performance that is substantially independent of temperature over the useful temperature range; resistance to degradation from heat, and water that may be encountered during use of the damping material; ability to withstand large strains encountered in seismic and wind sway damping situations; ease of bonding to rigid substrates; and handling characteristics that permit easy attainment of desired thicknesses and shapes.

Constrained-layer constructions can be prepared by several processes. In the one process, a layer of the vibration damping material is coated onto a release liner by conventional solution coating or hot melt coating techniques known in the art. The layer of resulting viscoelastic material is transferred to a stiff backing and adhered thereto, thereby providing a constrained-layer construction. If curing of the vibration damping material is desirable, it can take place after it is first coated or after it is transferred to the stiff backing. In another process, a layer of vibration damping material is coated directly onto a stiff backing by conventional solution coating or hot melt coating techniques known in the art and optionally cured. In each case, the constrained-layer construction is then affixed to the structure requiring damping. The construction may be attached in any manner provided that the constraining layer is only fixed to the vibrating structure via the viscoelastic material interface, i.e. free of mechanical attachment. When the structure subsequently vibrates under the influence of an internally or externally applied force, the vibration is damped.

Another application of the vibration damping materials of the present invention is in a bi-directional damping unit such as described in Nielsen, E. J. et al, "Viscoelastic Damper Overview For Seismic and Wind Applications," Structural Engineering Association of California, Tahoe Olympiad, October, 1994. Bi-directional damping is the transference of subsonic oscillations of a structure, such as a building, into the shear deformation of a viscoelastic material for the purpose of damping the oscillations of the structure. In this application, materials which have maximum vibration damping capability preferably have shear storage moduli, G', between about $6.9 \times 10^3$ Pa to $3.45 \times 10^7$ Pa, more preferably $3.5 \times 10^4$ Pa to $1.4 \times 10^7$ Pa, most preferably $3.5 \times 10^5$ Pa to $6.9 \times 10^6$ Pa at the use temperature, and have a tan δ as high as possible over the use temperature and frequency range. The materials also preferably have an elongation in tension of at least 100 percent or a shear strain capability of at least 100 percent within their use range of temperature and frequency.

When the vibration damping material has pressure-sensitive or hot melt adhesive properties, the material can usually be adhered to a stiff layer without the use of an additional bonding agent. However, it is sometimes necessary to use a thin layer, for example, 20–50 μm in thickness, of a high strength adhesive, such as, for example, an acrylic adhesive, an epoxy adhesive, or a silicone adhesive, all of which are well-known to those skilled in the art, to bond the vibration damping composition of the invention to a structure.

For most applications, the layer of viscoelastic material has a thickness of at least 0.01 mm up to about 100 mm, more preferably 0.05 to 100 mm. The viscoelastic material can be applied by any of the techniques known in the art such as by spraying, dipping, knife, or curtain coating, or molding, laminating, casting, or extruding.

As mentioned above, a stiff layer is an essential part of constrained-layer vibration-damping constructions of the present invention. A suitable material for a stiff layer preferably has a stiffness of at least about 100 times the stiffness, i.e., storage modulus, of the vibration damping material, the stiffness of the stiff layer being measured in extension. The desired stiffness of the stiff layer is varied by adjusting the thickness of this layer, for example from about 25 micrometers to 5 centimeters, depending on the modulus of the stiff layer. Examples of suitable materials include metals such as iron, steel, nickel, aluminum, chromium, cobalt, and copper, and alloys thereof and stiff polymeric materials such as polystyrene; polyester; polyvinyl chloride; polyurethane; polycarbonate; polyimide; and polyepoxide; fiber-reinforced plastics such as glass fiber-reinforced, ceramic fiber-reinforced, and metal fiber-reinforced polyester; glasses; and ceramics.

The vibration damping compositions of the present invention are useful in a variety of applications which demand effective damping over a broad range of temperature and frequency, with the additional requirement that minimum and/or maximum modulus requirements, over a specified range of temperatures, also be satisfied. It is often desirable that the region of maximum damping, that is, the point at which the loss factor is near a maximum, occurs in the center of the desired damping temperature and frequency range. Designing the optimum damping material for a specific application requires understanding the effect the polydiorganosiloxane oligourea segmented copolymer, the silicate resin, optional free radical initiator, moisture cure catalyst, silane crosslinking agent, and filler, and concentration of each have on damping performance.

Curable pressure-sensitive adhesives of the invention, dependent on specific formulation used, can be used to make pressure-sensitive adhesive sheet materials that may take the form of pressure-sensitive adhesive labels, pressure-sensitive adhesive signs, pressure-sensitive adhesive marking indices, pressure-sensitive adhesive tapes, including for example, foam-core or foam-backed tapes, pressure-sensitive adhesive transfer tapes, pressure-sensitive spray adhesives, pressure-sensitive adhesive medical tapes and articles, including for example, transdermal drug delivery devices, or pressure-sensitive adhesive coatings directly onto desired articles.

Pressure-sensitive adhesive sheets are made by applying the pressure-sensitive adhesive by well known hot melt coating, solvent coating, or lamination processes. Suitable substrates for pressure-sensitive adhesive sheets include paper and plastic films such as polyolefins, such as polypropylene and polyethylene, polyethylene terephthalate, polycarbonate, polyvinyl chloride, polytetrafluoroethylene, polyimide, such as DuPont's KAPTON™, cellulose acetate, and ethyl cellulose. Backings can also be of woven fabric formed of threads of synthetic or natural materials such as cotton, nylon, or rayon, such as those used in DUAL LOCK™ Reclosable Fasteners and SCOTCHMATE™ Hook and Loop Reclosable Fasteners, or glass or ceramic material, or they can be nonwoven fabric such as air-laid webs of natural or synthetic fibers or blends of these. In addition, suitable backings can be formed of metal, metallized polymeric film, acrylic, silicone, urethane, polyethylene, polypropylene, neoprene rubber, and the like, and filled and unfilled foamed materials, or ceramic sheet material. Primers and tie layers can be utilized but they are not always necessary.

In the case of pressure-sensitive tapes, these materials are typically applied by first making a tape construction which comprises a layer of the curable pressure-sensitive adhesive material coated evenly on a backing and which may be subsequently cured as needed. The adhesive can then be covered with a liner, rolled upon itself wherein the backside of the tape is release coated, or applied directly to a desired surface.

A transfer tape can be made by coating the curable composition between two liners both of which are coated with a release coating and subsequently cured as needed. The release liners often comprise a clear polymeric material such as a polyolefin or a polyester that is transparent to ultraviolet radiation. Preferably, each release liner is first coated with a release material for the curable pressure-sensitive adhesive utilized in the invention.

The curable adhesive compositions of the invention can also be coated onto a differential release liner; that is, a release liner having a first release coating on one side of the liner and a second release coating coated on the opposite side, and subsequently cured as needed. The two release coatings preferably have different release values. For example, one release coating may have a release value of 5 grams/cm (i.e., 5 grams of force is needed to remove a strip of material 1 cm wide from the coating) while the second release coating has a release value of 15 grams/cm. The curable pressure-sensitive adhesive material is typically coated over the release liner coating having the higher release value and subsequently cured as needed. The resulting tape can be wound into a roll. As the tape is unwound, the curable or cured pressure-sensitive adhesive adheres to the release coating with the higher release value. After the tape is applied to a substrate and subsequently cured as needed, the release liner can be removed to expose a curable or cured adhesive surface for further use and which may be subsequently cured as needed. The curable pressure-sensitive adhesive coating may be cured at any point in the process after it is coated.

Useful release liners include those that are suitable for use with silicone adhesives and organic pressure-sensitive adhesives. Useful release liner release coating compositions are described in, for example, European Patent Publication 378,420, U.S. Pat No. 4,889,753, and European Patent Publication No. 311,262. Commercially available release coating compositions include SYL-OFF™ Q2-7785 fluorosilicone release coating, available from Dow Corning Corp., Midland, Mich.; X-70-029HS fluorosilicone release coating, available from Shin-Etsu Silicones of America, Torrance, Calif.; S TAKE-OFF™ 2402 fluorosilicone release liner from Release International, Bedford Park, Ill., and the like.

The hot melt adhesive compositions of the present invention are useful in a variety of applications that require good adhesion to different substrates, including low surface energy materials, broad temperature range, minimized influence from humidity. They are particularly useful in electronic industry to assemble electrical components, wire tacking, wire terminal bonding, insulations, potting, and sealing, for example, fixation of deflection yoke.

The optional filler employed in compositions of the present invention may be used for several purposes such as to affect a change in dynamic mechanical performance, to increase thermal conductivity, or to reduce the cost of the composition.

The present invention is further illustrated by the following examples which are not intended to limit the scope of the invention. In the examples all parts and percentages are by weight unless otherwise indicated. All molecular weights reported are number average molecular weights in g/mol.

Preparation of Polydimethylsiloxane Diamines

Multiple lots of some of the diamines were synthesized for various examples. The actual number average molecular weight of the different lots are determined by the following acid titration. Sufficient polydimethylsiloxane diamine to yield about 1 milliequivalent of amine is dissolved in 50/50 tetrahydrofuran/isopropyl alcohol to form a 10% solution. This solution is titrated with 1.0N hydrochloric acid with bromophenyl blue as an indicator to determine number average molecular weight. The molecular weights are dependent on the exact ratio of the reactants used in the diamine synthesis and the extent of stripping cyclic siloxanes. Remaining cyclics are diluents which increase the titrated molecular weight of polydimethylsiloxane diamine.

Polydimethylsiloxane Diamine A

A mixture of 4.32 parts bis(3-aminopropyl)tetramethyl disiloxane and 95.68 parts octamethylcyclotetrasiloxane was placed in a batch reactor and purged with nitrogen for 20 minutes. The mixture was then heated in the reactor to 150° C. Catalyst, 100 ppm of 50% aqueous cesium hydroxide, was added and heating continued for 6 hours until the bis(3-aminopropyl)tetramethyl disiloxane had been consumed. The reaction mixture was cooled to 90° C., neutralized with excess acetic acid in the presence of some triethylamine, and heated under high vacuum to remove cyclic siloxanes over a period of at least five hours. The material was cooled to ambient temperature, filtered to remove any cesium acetate which had formed, and titrated with 0.1N hydrochloric acid to determine number average molecular weight. The molecular weights were Lot 1: 5280 and Lot 2: 5,310.

Polydimethylsiloxane Diamine B

Polydimethylsiloxane diamine was prepared as described for Polydimethylsiloxane Diamine A except 2.16 parts bis (3-aminopropyl)tetramethyl disiloxane and 97.84 parts octamethylcyclotetrasiloxane were used. The molecular weights of Polydimethylsiloxane Diamine B was 10,700.

Polydimethylsiloxane Diamine C

A mixture of 21.75 parts Polydimethylsiloxane Diamine A and 78.25 parts octamethylcyclotetrasiloxane was placed in a batch reactor, purged with nitrogen for 20 minutes and then heated in the reactor to 150° C. Catalyst, 100 ppm of 50% aqueous cesium hydroxide, was added and heating continued for 3 hours until equilibrium concentration of cyclic siloxanes was observed by gas chromatography. The reaction mixture was cooled to 90° C., neutralized with excess acetic acid in the presence of some triethylamine, and heated under high vacuum to remove cyclic siloxanes over a period of at least 5 hours. The material was cooled to ambient temperature, filtered, and titrated with 0.1N hydrochloric acid to determine number average molecular weight. The molecular weight of Polydimethylsiloxane Diamine C was 22,300.

Polydimethylsiloxane Diamine D

Polydimethylsiloxane diamine was prepared as described for Polydimethylsiloxane Diamine C except 12.43 parts Polydimethylsiloxane Diamine A and 87.57 parts octamethylcyclotetrasiloxane were used. Three lots of Polydimethylsiloxane Diamine D were prepared. The molecular weights were Lot 1: 35,700, Lot 2: 37,800, and Lot 3: 34,800.

Polydimethylsiloxane Diamine E

Polydimethylsiloxane diamine was prepared as described for Polydimethylsiloxane Diamine C except that 8.7 parts Polydimethylsiloxane Diamine A and 91.3 parts octamethylcyclotetrasiloxane were used. The molecular weight of Polydimethylsixone Diamine E was 58,700.

Polydiphenyldimethylsiloxane Diamine F

To a 3-necked round bottom flask fit with mechanical stirrer, static nitrogen atmosphere, oil heating bath, thermometer, and reflux condenser, were added 75.1 parts octamethylcyclotetrasiloxane, 22.43 parts octaphenylcyclotetrasiloxane, and 2.48 parts bis(3-aminopropyl)tetramethyl disiloxane. Under static nitrogen atmosphere, the reactants were heated to 150° C. and degassed under aspirator vacuum for 30 seconds before restoring static nitrogen atmosphere. A charge of 0.2 g cesium hydroxide solution (50% aqueous) was added to the flask and heating continued for 16 hours at 150° C. The flask was cooled to ambient temperature and then 2 mL triethylamine and 0.38 mL acetic acid were added. With good agitation flask was placed under a vacuum of 100 N/m$^2$ (100 Pa), heated to 150° C., and maintained at 150° C. for 5 hours to remove volatile materials. After 5 hours heat was removed and contents cooled to ambient temperature. The molecular weight of Polydiphenyldimethylsiloxane Diamine F was 9620.

Polydimethylsiloxane Oligourea Segmented Copolymer A

Polydimethylsiloxane Diamine D, Lot 1, molecular weight 35,700, was added to the first zone of an 18 mm co-rotating twin screw extruder having a 40:1 length:diameter ratio (available from Leistritz Corporation, Allendale, N.J.) at a rate of 7.93 g/min (0.000444 equivalents amine/min). A mixture of 27.5 parts by weight methylenedicyclohexylene-4,4'-diisocyanate, 16.3 parts by weight isocyanatoethyl methacrylate and 56.2 parts by weight DAROCUR™ 1173, a photoinitiator available from Ciba-Geigy Corp., was fed into the sixth zone at a rate of 0.181 g/min (0.000570 equivalents isocyanate/min). The feed line of this stream was placed closely to the screw threads. The extruder had double-start fully intermeshing screws throughout the entire length of the barrel, rotating at 150 revolutions per minute. The temperature profile for each of the 90 mm long zones was: zones 1 and 2—30° C.; zone 3—32° C.; zone 4—37° C.; zone 5—50° C.; zone 6—60° C.; zone 7—80° C.; zone 8—110° C.; and endcap—120° C. The extrudate was cooled in air.

Polydimethyldiphenylsiloxane Oligourea Segmented Copolymer B

To a 3-necked round bottom flask fit with static argon atmosphere, pressure equalizing addition funnel, and mechanical stirrer was added 100.3 parts Polydimethyldiphenylsiloxane Diamine F and 94 parts toluene. To the addition funnel was added a solution of 1.82 parts methylenedicyclohexylene-4,4'-diisocyanate, 1.08 parts isocyanatoethyl methacrylate, and 56.8 parts toluene, and this solution was added dropwise to the stirred reaction flask over a period of about 12 minutes. The flask contents stirred an additional 4 hours to complete the reaction before draining from the flask and packaging in a glass jar.

Test Methods

The following test methods were used to characterize the polydimethylsiloxane oligourea segmented copolymers produced in the Examples.

Characterization of Cured Samples

Samples were prepared using one of the following methods:

1) coating the pressure-sensitive adhesive, using a knife coater with orifice set between about 125 to 150 μm, between 38 μm (1.5 mil) thick primed (aminated polybutadiene) polyester film and 50 μm (2 mil) thick polyester release liner.

2) casting a solution of pressure-sensitive adhesive directly onto a polyester film and allowing it to dry at 65° C. for 10 minutes to obtain a pressure-sensitive adhesive tape having an adhesive thickness of 38 μm (1.5 mil).

3) hot melt coating the pressure-sensitive adhesive with a 1.91 cm diameter (¾ inch) long single screw extruder (Haake) rotating at 40 revolutions per minute (temperature profile of the extruder was: zone 1—not controlled; zone 2—163° C.; and zone 3—188° C., necktube and die (12.7 cm wide)—210° C.) between nip rolls with a 35.6 μm (1.4 mil) thick polyethylene terephthalate film on one roll and a 50 μm (2 mil) thick release liner on the other roll to achieve an adhesive thickness of about 40–50 μm (about 1.5–2 mil).

Free-radically curable materials were squeezed between two polyester films to a thickness of approximately 1 mm and cured at an intensity of 1.73 mW for a given length of time with low intensity ultraviolet lights.

A Rheometrics RDA II Rheometer using dynamic temperature ramp mode (−30° C.–175° C.) at a ramp rate of 5° C., 25 mm parallel plates, a strain of 2.0% and a frequency of 10.0 rad/s was used to measure the loss factor. Sample thickness was 1–2 mm.

180° Peel Adhesion

Polydiorganosiloxane oligourea segmented copolymer based pressure-sensitive adhesive coatings were covered with a release liner and cut into 12.7 mm (0.5 inch) by 15 cm (6 inch) strips. The release liner was removed and the strip adhered to a 10 cm (4 inch) by 20 cm (8 inch) clean, solvent washed glass coupon using a 2 kg (4-½ pound) roller passed twice over the strip. The bonded assembly dwelled at room temperature for about twenty minutes and was tested for 180° peel adhesion using an I-Mass peel tester at a separation rate of 30.5 cm/minute (12 inches/minute) over a 10 second data collection time. Two samples were tested; the reported adhesion value is an average of the two samples. Preferably, the pressure-sensitive adhesive tapes have an 180° peel adhesion of at least about 5.5 N/dm (5 oz./inch), more preferably at least about 21.8 N/dm (20 oz./inch).

Shear Strength

Polydiorganosiloxane oligourea segmented copolymer based pressure-sensitive adhesive coatings were covered with a release liner and cut into 12.7 mm (0.5 inch) by 15 cm (6 inch) inch strips. The release liner was removed and the strip adhered to a stainless steel panel such that a 12.7 mm by 12.7 mm portion of each strip was in firm contact with the panel with one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus insuring that only the shear forces were measured, in an attempt to more accurately determine the holding power of the tape being tested. The time elapsed for each tape example to separate from the test panel was recorded as the shear strength. Unless otherwise noted, all shear failures reported herein were cohesive failures of the adhesive.

90° Peel Adhesion

Test samples were prepared by removing the release liner from the polydiorganosiloxane oligourea segmented copolymer based pressure-sensitive adhesive of a coated loop substrate and adhering the strip to a primed, anodized aluminum strip using a 4-½ pound (2 kg) roller passed twice over the strip. The bonded assembly dwelled at room temperature for 24 hours and was tested for 90° peel adhesion using an INSTRON™ tensile tester at a separation rate of 12 inches/minute (30.5 cm/minute). Three samples were tested; the reported adhesion value is an average of the three samples.

Vertical Burn Test

Reference: Federal Aviation Regulation (FAR) 25.853 paragraph (a) (1) (i)-60 Second Vertical Burn test (unsupported)

Test samples were prepared by removing the release liner from the polydiorganosiloxane oligourea segmented copolymer based pressure-sensitive adhesive of a coated loop substrate and suspending the sample in the test fixture described in above cited FAR standard. The sample was subjected to flame from a Bunsen burner for 60 seconds and then the flame was removed and the sample was allowed to extinguish on its own. The Drip Extinguish Time was the elapsed time between a flaming drip formation and the drip flame extinction, the Extinguish Time was the elapsed time from when the flame was removed to the time the sample ceased to flame, and the Burn Length was determined by the distance the sample had burned along its length.

Hot-Melt Adhesive Bonding Test

Tackified polydiorganosiloxane oligourea segmented copolymers were tested as curable hot-melt adhesives by creating overlap shear specimens, between two UV transparent substrates, having an overlap area of about 1.61 cm² and pulling the overlap shear sample in an H-frame style Sintech testing machine at a crosshead rate of 50.8 cm/min to assess adhesion. Samples were prepared for testing as follows. A glass, or polymethylmethacrylate (PMMA) slide measuring 0.32 cm×1.27 cm×5.08 cm was cleaned with isopropanol. A small portion, about 0.2 g, of the tackified UV curable hot-melt adhesive was placed on one glass slide, covered with a second slide of glass and held in place with a small spring steel notebook clip. Bond thickness was controlled by placing two parallel strands of 12 mil (0.3 mm) diameter copper wire, oriented in the cross direction with respect to the long dimension of the glass about 0.2 cm from the end of the glass coupons. The overlap shear sample was placed in a forced air oven for 15–25 minutes at 140° C. (glass), or 85° C. (PMMA), removed, allowed to cool to ambient conditions in air, cured by exposure to low intensity UV light for 1 hour, trimmed to size, and tested as described above. The maximum adhesion force at break is reported in MN/m².

Damping Properties (Storage modulus and Loss Factor)

Sample thickness was about 1 mm and was obtained using one of the following methods for all but the bi-directional damper:

1) pouring the solution onto a fluorosilicone coated 50 μm thick polyethylene terephthalate release liner at the bottom of an aluminum pan, allowing the solution to air dry overnight, gathering the vibration damping material together in a thicker mass, placing the mass between two release liners separated by a 1 mm spacer and in turn between two 5 mm glass plates, applying sufficient pressure on the glass plate sandwich to allow the uncured mass to flow out into a suitable 1 mm thick layer, and unless otherwise noted, radiation curing the vibration damping material by exposure, through the glass plates, to low intensity ultraviolet radiation from General Electric F40BL lamps at an intensity of 1.74 mW/cm$^2$ for 20 minutes, or 2) pouring a solution of the vibration damping material onto a shallow TEFLON™ lined tray, drying the vibration damping material by heating it in an oven at 65° C. for 20 min, and moisture curing by exposure to ambient temperature and humidity for 1 week, to obtain a 1 mm thick section.

The storage modulus, G', and the loss factor, tan δ, were determined over a range of temperatures using a Polymer Laboratories Dynamic Mechanical Thermal Analyzer (DMTA) Mark II and a technique of multiplexing frequency during a thermal scan, i. e., properties were measured while both frequency and temperature were changing. The temperature was varied from −100° C. to 200° C. at a rate of 2° C./minute continuous. Measurements were taken at a strain setting of 1, reported at a frequency of 1.0 Hz, and were taken at about 3 to 5° C. intervals and interpolated to obtain measurements at 10° C. intervals for reporting purposes.

In these examples, the storage modulus, G', utility window refers to the temperature range over which the storage modulus is between $3.45 \times 10^5$ Pa and $6.9 \times 10^6$ Pa. The loss factor, tan δ, utility window refers to the temperature range over which the loss factor is greater than or equal to 0.4. The useful temperature range refers to the temperature range over which storage modulus, G', is between $3.45 \times 10^5$ Pa and $6.9 \times 10^6$ Pa and the loss factor, tan δ, is greater than 0.4. When so indicated, melt flow means the sample exhibited melt flow at high temperature. Melt flow is generally undesirable for damping applications. Thus, materials that exhibit melt flow must be utilized below the melt flow temperature.

In the following examples, all polyisocyanates and endcapping agents were used as received and the isocyanate:amine ratios for the polyisocyanates, polyamines, and endcapping agents were calculated using the polyisocyanate molecular weight reported by the polyisocyanate supplier, the polyamine molecular weight as determined by acid titration, and the endcapping agent molecular weight reported by the endcapping agent supplier.

EXAMPLES

Examples 1–5

In Example 1, a polydimethylsiloxane oligourea segmented copolymer composition was made by reacting 52.76 parts (10.00 mmoles) Polydimethylsiloxane Diamine A, molecular weight 5280, dissolved in 50 parts toluene, and a mixture of 1.75 parts (6.67 mmoles) of methylenedicyclohexylene-4,4'-diisocyanate and 1.03 parts (6.67 mmoles) of isocyanatoethyl methacrylate (available as MOI from Showa Rhodia Chemicals, Tokyo, Japan) dissolved in 48 parts toluene and slowly added at room temperature to the solution of diamine with vigorous stirring. Then, to the copolymer solution was added SR-545 silicate resin solution to achieve 120 parts (based on dry weight) per 100 parts polydimethylsiloxane oligourea segmented copolymer (based on dry weight). To the copolymer/resin solution was added 1 part DAROCUR™ 1173 (a photoinitiator available from Ciba-Geigy, Hawthorne, N.Y.) per 100 parts of copolymer/resin blend solids, and the solution was subsequently air dried on a release liner film.

The resulting polydimethylsiloxane oligourea segmented copolymer was coated using a knife coater at 130° C. between a 40 μm (1.5 mil) primed polyester film and a 40 μm (1.5 mil) polyester release liner (S TAKE-OFF™, available from Release International, Bedford Park, Ill.) to a coating thickness of about 50 μm (2.0 mil), exposed to 1.73 mW for 20 minutes ultraviolet radiation from a low intensity ultraviolet lamp Model General Electric F40BL, to form a pressure-sensitive adhesive tape. The results of testing are summarized in Table 1.

A second portion of the resulting polydimethysiloxane oligourea segmented copolymer was pressed between two release liners into a uniform sample of approximately 1 mm thickness, and cured by exposure to low intensity UV lights to form a cured vibration damping material.

In Example 2, a polydimethylsiloxane oligourea segmented copolymer composition was prepared as in Example 1, except 500 parts (43.0 mmoles) Polydimethylsiloxane Diamine B, molecular weight 10,700, dissolved in 300 parts toluene was substituted for Diamine A, and a mixture of 7.51 parts (28.7 mmoles) of methylenedicyclohexylene-4,4'-diisocyanate and 4.44 parts (28.7 mmoles) isocyanatoethyl methacrylate dissolved in 200 parts was used in the synthesis of the polydimethylsiloxane oligourea segmented copolymer.

A portion of the polydimethylsiloxane oligourea segmented copolymer was coated and cured as in Example 1 to form a pressure-sensitive adhesive tape.

In Example 3, a polydimethylsiloxane oligourea segmented copolymer was prepared as in Example 1, except 600 parts (27.0 mmoles) Polydimethylsiloxane Diamine C, molecular weight 22,300, dissolved in 404 parts toluene was substituted for Diamine A and a mixture of 4.71 parts (18.0 mmoles) of methylenedicyclohexylene-4,4'-diisocyanate and 2.79 parts (18.0 mmoles) of isocyanatoethyl methacrylate dissolved in 195 parts toluene was used in the synthesis of the polydimethylsiloxane oligourea segmented copolymer.

A portion of the resulting polydimethylsiloxane oligourea segmented copolymer was coated and cured as in Example 1 to form a pressure-sensitive adhesive tape.

Another portion of the solution was pressed between two release liners into a uniform sample of approximately 1 mm thickness, and cured by exposure to low intensity UV lights to form a cured vibration damping material.

In Example 4, a polydimethylsiloxane oligourea segmented copolymer was made by dissolving 10 parts Polydimethylsiloxane Oligourea Segmented Copolymer A in a mixture of 17 parts toluene and 2 parts 2-propanol containing 12 parts dried SR-545 silicate resin (prepared by spray drying under nitrogen to achieve less than 1% toluene) and 0.1 part DAROCUR™ 1173 followed by air drying on a release liner.

A portion of the resulting polydimethylsiloxane oligourea segmented copolymer was coated and cured as in Example 1 to form a pressure-sensitive adhesive tape.

Another portion of the solution was pressed between two release liners into a uniform sample of approximately 1 mm thickness, and cured by exposure to low intensity UV lights to form a cured vibration damping material.

In Example 5, a polydimethylsiloxane oligourea segmented copolymer was prepared as in Example 1, except 100 parts (2.01 mmoles) Polydimethylsiloxane Diamine E, molecular weight 58,700, dissolved in 123 parts toluene were substituted for Diamine A, and a mixture of 0.35 parts (1.34 mmoles) of methylenedicyclohexylene-4,4'-diisocyanate and 0.21 parts (1.34 mmoles) of isocyanatoethyl methacrylate dissolved in 56 parts toluene was used in the synthesis of the polydimethylsiloxane oligourea segmented copolymer.

A portion of the resulting polydimethylsiloxane oligourea segmented copolymer was coated and cured as in Example 1.

Another portion of the solution was pressed between two release liners into a uniform sample of approximately 1 mm thickness, and cured by exposure to low intensity UV lights to form a cured vibration damping material.

Each of the pressure-sensitive adhesive tapes of Examples 1–5 which had a thickness of about 50 μm, was tested for 180° peel adhesion from glass and shear strength on stainless steel. The results are reported in Table 1.

The storage modulus, G', and loss factor, tan δ, were determined at 1 Hz for the vibration damping materials of Examples 1 and 3–5 and are summarized in Table 2.

TABLE 1

| Example | 180° Peel adhesion N/dm | Shear Strength (min) |
| --- | --- | --- |
| 1 | 31 | >10,000 |
| 2 | 51 | >10,000 |
| 3 | 33 | >10,000 |
| 4 | 66 | 7,700 popoff |
| 5 | 59 | 2300 popoff |

The data in Table 1, demonstrates that generally, as the molecular weight of the Polydimethylsiloxane Diamine used in preparing the copolymer increased, the peel adhesion increased. Those shear strength values which were reported as "popoff" indicate adhesive failure mode, not necessarily indicative of shear strength.

TABLE 2

| Temp (° C.) | Example 1 G' (Pa) | Tan δ | Example 3 G' (Pa) | Tan δ | Example 4 G' (Pa) | Tan δ | Example 5 G' (Pa) | Tan δ |
| --- | --- | --- | --- | --- | --- | --- | --- | --- |
| −90 | $8.28 \times 10^7$ | 0.03 | $8.57 \times 10^7$ | 0.03 | $9.98 \times 10^7$ | 0.04 | $7.55 \times 10^7$ | 0.04 |
| −80 | $7.61 \times 10^7$ | 0.04 | $7.72 \times 10^7$ | 0.04 | $8.92 \times 10^7$ | 0.05 | $6.61 \times 10^7$ | 0.06 |
| −70 | $6.80 \times 10^7$ | 0.05 | $6.63 \times 10^7$ | 0.08 | $7.73 \times 10^7$ | 0.07 | $5.48 \times 10^7$ | 0.09 |
| −60 | $6.05 \times 10^7$ | 0.08 | $5.69 \times 10^7$ | 0.11 | $6.22 \times 10^7$ | 0.12 | $4.53 \times 10^7$ | 0.14 |
| −50 | $5.40 \times 10^7$ | 0.09 | $4.82 \times 10^7$ | 0.14 | $5.24 \times 10^7$ | 0.15 | $3.65 \times 10^7$ | 0.18 |
| −40 | $4.82 \times 10^7$ | 0.11 | $3.93 \times 10^7$ | 0.18 | $4.31 \times 10^7$ | 0.19 | $2.83 \times 10^7$ | 0.24 |
| −30 | $4.22 \times 10^7$ | 0.12 | $3.03 \times 10^7$ | 0.23 | $3.20 \times 10^7$ | 0.26 | $1.97 \times 10^7$ | 0.33 |
| −20 | $3.51 \times 10^7$ | 0.16 | $2.16 \times 10^7$ | 0.31 | $2.15 \times 10^7$ | 0.35 | $1.03 \times 10^7$ | 0.52 |
| −10 | $2.93 \times 10^7$ | 0.19 | $1.49 \times 10^7$ | 0.39 | $1.49 \times 10^7$ | 0.44 | $5.37 \times 10^6$ | 0.72 |
| 0 | $2.29 \times 10^7$ | 0.23 | $8.36 \times 10^6$ | 0.55 | $9.06 \times 10^6$ | 0.57 | $2.82 \times 10^6$ | 0.84 |
| 10 | $1.69 \times 10^7$ | 0.29 | $4.44 \times 10^6$ | 0.68 | $5.49 \times 10^6$ | 0.68 | $1.52 \times 10^6$ | 0.91 |
| 20 | $1.14 \times 10^7$ | 0.36 | $2.35 \times 10^6$ | 0.76 | $3.48 \times 10^6$ | 0.75 | $8.06 \times 10^5$ | 0.92 |
| 30 | $6.97 \times 10^6$ | 0.45 | $1.27 \times 10^6$ | 0.78 | $2.17 \times 10^6$ | 0.77 | $4.33 \times 10^5$ | 0.87 |
| 40 | $4.20 \times 10^6$ | 0.52 | $6.58 \times 10^5$ | 0.76 | $1.37 \times 10^6$ | 0.79 | $2.50 \times 10^5$ | 0.76 |
| 50 | $2.44 \times 10^6$ | 0.57 | $3.76 \times 10^5$ | 0.69 | $8.49 \times 10^5$ | 0.79 | $1.58 \times 10^5$ | 0.65 |
| 60 | $1.37 \times 10^6$ | 0.62 | $2.32 \times 10^5$ | 0.62 | $5.44 \times 10^5$ | 0.76 | $1.09 \times 10^5$ | 0.56 |
| 70 | $7.62 \times 10^5$ | 0.66 | $1.51 \times 10^5$ | 0.55 | $3.58 \times 10^5$ | 0.72 | $8.24 \times 10^4$ | 0.52 |
| 80 | $4.36 \times 10^5$ | 0.68 | $1.08 \times 10^5$ | 0.51 | $2.42 \times 10^5$ | 0.67 | $6.37 \times 10^4$ | 0.50 |
| 90 | $2.78 \times 10^5$ | 0.67 | $8.45 \times 10^4$ | 0.49 | $1.75 \times 10^5$ | 0.64 | $5.11 \times 10^4$ | 0.51 |
| 100 | $1.86 \times 10^5$ | 0.66 | $6.50 \times 10^4$ | 0.47 | $1.27 \times 10^5$ | 0.61 | $4.12 \times 10^4$ | 0.52 |
| 110 | $1.33 \times 10^5$ | 0.63 | $5.02 \times 10^4$ | 0.47 | $9.62 \times 10^4$ | 0.60 | $3.31 \times 10^4$ | 0.53 |
| 120 | $1.01 \times 10^5$ | 0.58 | $3.88 \times 10^4$ | 0.45 | $7.33 \times 10^4$ | 0.60 | $2.51 \times 10^4$ | 0.57 |
| 130 | $8.01 \times 10^4$ | 0.52 | $3.37 \times 10^4$ | 0.42 | $5.54 \times 10^4$ | 0.60 | $2.15 \times 10^4$ | 0.59 |
| 140 | $6.93 \times 10^4$ | 0.43 | $3.01 \times 10^4$ | 0.35 | $4.09 \times 10^4$ | 0.60 | $1.73 \times 10^4$ | 0.59 |
| 150 | $6.54 \times 10^4$ | 0.32 | $2.85 \times 10^4$ | 0.31 | $3.31 \times 10^4$ | 0.59 | $1.63 \times 10^4$ | 0.56 |
| 160 | $6.62 \times 10^4$ | 0.23 | $2.99 \times 10^4$ | 0.28 | $2.69 \times 10^4$ | 0.57 | $1.43 \times 10^4$ | 0.54 |
| 170 | $6.87 \times 10^4$ | 0.17 | $2.83 \times 10^4$ | 0.23 | $2.23 \times 10^4$ | 0.55 | $1.21 \times 10^4$ | 0.53 |
| 180 | $7.11 \times 10^4$ | 0.14 | $2.22 \times 10^4$ | 0.20 | $1.87 \times 10^4$ | 0.52 | $7.49 \times 10^3$ | 0.61 |
| 190 | — | — | $1.11 \times 10^4$ | 0.21 | — | — | — | — |

As can be seen from the data in Table 2, as the molecular weight of the diamine used to produce the cured polydimethylsiloxane oligourea segmented copolymer based vibration damping material increased from 5,280 to 58,700, the utility window for G' changed from 30 to 85° C. for Example 1, 3 to 52° C. for Example 3, 5 to 71° C. for Example 4, and −14 to 34° C. for Example 5. Examples 1 and 3–5 had useful tan δ utility windows of 25 to 143° C., −9 to 132° C., −13 to melt flow, and −25 to melt flow, respectively. Thus, a useful temperature range was seen at 30 to 85° C. for Example 1, and was the same as the G' utility window for Examples 3–5 as these values were narrower than the temperature ranges for tan δ.

Examples 6–9

In Example 6, a mixture of 27.5 parts by weight methylenedicyclohexylene-4,4'-diisocyanate, 16.3 parts isocyanatoethyl methacrylate, and 56.3 parts DAROCUR™ 1173 was fed into the first zone of an 18 mm co-rotating twin screw extruder having a 40:1 length:diameter ratio (available from Leistritz Corporation, Allendale, N.J.) at a rate of 0.105 g/min (0.000330 equivalents isocyanate/min). The feed line of the diisocyanate was placed close to the screw threads. Polydimethylsiloxane Diamine D, Lot 1, molecular weight 35,700, was injected into the second zone at a rate of 6.2 g/min (0.000347 equivalents amine/min). Dry MQ resin, obtained from General Electric Silicones as experimental material #1170-002, and further dried overnight under vacuum at 55° C. to less than 0.1% toluene was fed into zone four at a rate of 8.0 g/min. The extruder had double-start fully intermeshing screws throughout the entire length of the barrel, rotating at 300 revolutions per minute. The temperature profile for each of the 90 mm long zones was: zone 1—20° C.; zone 2—25° C.; zone 3—46° C.; zone 4—80° C.; zone 5—90° C.; zone 6—115° C.; zone 7—95° C.; zone 8—110° C.; and endcap—120° C. Zone six was vacuum vented to remove entrained air in the material. The resultant polydimethylsiloxane oligourea segmented copolymer-based pressure-sensitive adhesive was extruded, cooled in air, and collected. The pressure-sensitive adhesive was coated and cured as in Example 1 to form a pressure-sensitive adhesive tape having an adhesive thickness of 50 μm.

In Example 7, a polydimethylsiloxane oligourea segmented copolymer pressure-sensitive adhesive composition was prepared as in Example 1, except 100.0 parts (2.96 mmoles) Polydimethylsiloxane Diamine D, (Lot 3) molecular weight 34,800, dissolved in a mixture of 98 parts toluene was substituted for Diamine A, and a mixture of 0.58 parts (1.97 mmoles) of tetramethyl-m-xylylene diisocyanate and 0.31 parts (1.97 mmoles) of isocyanatoethyl methacrylate dissolved in 29 parts toluene was used in the synthesis of the polydimethylsiloxane oligourea segmented copolymer. The resulting polydimethylsiloxane oligourea segmented copolymer pressure-sensitive adhesive composition was coated and cured as in Example 1 to form a pressure-sensitive adhesive tape having an adhesive thickness of 62 μm.

In Example 8, a polydimethylsiloxane oligourea segmented copolymer pressure-sensitive adhesive composition was prepared as in Example 1, except 100.0 parts (2.96 mmoles) Polydimethylsiloxane Diamine D (Lot 3), molecular weight 34,800 in 93 parts toluene were substituted for Diamine A, and a mixture of 0.50 parts (1.97 mmoles) of 1,12-diisocyanatododecane, 0.31 parts (1.97 mmoles) of isocyanatoethyl methacrylate in 32 parts toluene was used in the synthesis of the polydimethylsiloxane oligourea segmented copolymer. The resulting polydimethylsiloxane oligourea segmented copolymer pressure-sensitive adhesive composition was coated and cured as in Example 1 to form a pressure-sensitive adhesive tape having an adhesive thickness of 62 μm.

In Example 9, a polydimethylsiloxane oligourea segmented copolymer pressure-sensitive adhesive composition was prepared as in Example 1, except 100.0 parts (2.96 mmoles) Polydimethylsiloxane Diamine D (Lot 3), molecular weight 34,800 in 95 parts toluene was substituted for Diamine A and a mixture of 0.49 parts (1.97 mmoles) of methylenediphenylene-4,4'-diisocyanate, 0.31 parts (1.97 mmoles) of isocyanatoethyl methacrylate in 42 parts toluene and 3 parts 2-propanol was used in the synthesis of the polydimethylsiloxane oligourea segmented copolymer. The resulting polydimethylsiloxane oligourea segmented copolymer pressure-sensitive adhesive composition was coated and cured as in Example 1 to form a pressure-sensitive adhesive tape having an adhesive thickness of 62 μm.

The pressure-sensitive adhesive tapes of each of Examples 6–9 was tested for 180° peel adhesion on glass and shear strength on stainless steel. The results are set forth in Table 3.

TABLE 3

| Example | 180° Peel adhesion (N/dm) | Shear (min) |
|---|---|---|
| 6 | 85 | 3,000 popoff |
| 7 | 55 | 471 popoff |
| 8 | 61 | 130 popoff |
| 9 | 65 | 2410 popoff |

The data in Table 3 demonstrates that the selection of diisocyanate in preparing the copolymer portion of the pressure-sensitive adhesive of the present invention was not critical.

Examples 10–12

In Example 10, a vibration damping material was prepared and tested as in Example 1, except 200 parts (37.9 mmoles) Polydimethylsiloxane Diamine A, Lot 1, molecular weight 5280, in 200 parts toluene, a mixture of 6.17 parts (25.3 mmoles) of tetramethyl-m-xylylene diisocyanate and 3.92 parts (25.3 mmoles) of isocyanatoethyl methacrylate, were used in the synthesis of this polydimethylsiloxane oligourea segmented copolymer. To this solution was added SR-545 silicate resin solution to achieve 120 parts silicate resin (based on dry weight) per 100 parts copolymer (based on dry weight). To this copolymer/resin solution was added 1.0 part DAROCUR™ 1173 per 100 parts of copolymer/resin blend solids. The solution was subsequently poured onto a release liner, dried, pressed between two release liners into a uniform sample of approximately 1 mm thickness, and cured by exposure to low intensity UV lights to form a cured vibration damping material.

Examples 11 and 12 were prepared in the same manner as Example 10 except, in Example 11, 6.37 parts 1,12-diisocyanatododecane was substituted for the tetramethyl-m-xylylene diisocyanate and, in Example 12, 6.33 parts methylenediphenylene-4,4'-diisocyanate was substituted for the tetramethyl-m-xylylene diisocyanate.

The storage modulus, G', and tan δ were determined for the vibration damping materials of Examples 10–12. The results are set forth in Table 4 together with those of Example 1, a similar composition employing methylenedicyclohexylene-4,4'-diisocyanate as the diisocyanate.

6—170° C.; zone 7—180° C.; zone 8—125° C.; and endcap—120° C. Zone seven was vacuum vented. The resultant polymer was extruded, cooled in air, and collected.

TABLE 4

| Temp (° C.) | Example 1 | | Example 10 | | Example 11 | | Example 12 | |
|---|---|---|---|---|---|---|---|---|
| | G' (Pa) | Tan δ | G' (Pa) | Tan δ | G' (Pa) | Tan δ | G' (Pa) | Tan δ |
| −90 | $8.28 \times 10^7$ | 0.03 | $8.74 \times 10^7$ | 0.03 | $8.45 \times 10^7$ | 0.03 | $1.05 \times 10^8$ | 0.02 |
| −80 | $7.61 \times 10^7$ | 0.04 | $7.65 \times 10^7$ | 0.06 | $7.85 \times 10^7$ | 0.04 | $9.97 \times 10^7$ | 0.02 |
| −70 | $6.80 \times 10^7$ | 0.05 | $6.73 \times 10^7$ | 0.07 | $7.13 \times 10^7$ | 0.05 | $9.41 \times 10^7$ | 0.03 |
| −60 | $6.05 \times 10^7$ | 0.08 | $6.09 \times 10^7$ | 0.08 | $6.34 \times 10^7$ | 0.07 | $9.00 \times 10^7$ | 0.04 |
| −50 | $5.40 \times 10^7$ | 0.09 | $5.45 \times 10^7$ | 0.09 | $5.60 \times 10^7$ | 0.09 | $8.47 \times 10^7$ | 0.04 |
| −40 | $4.82 \times 10^7$ | 0.11 | $4.93 \times 10^7$ | 0.10 | $4.94 \times 10^7$ | 0.11 | $8.03 \times 10^7$ | 0.05 |
| −30 | $4.22 \times 10^7$ | 0.12 | $4.33 \times 10^7$ | 0.12 | $4.38 \times 10^7$ | 0.12 | $7.64 \times 10^7$ | 0.04 |
| −20 | $3.51 \times 10^7$ | 0.16 | $3.63 \times 10^7$ | 0.15 | $3.59 \times 10^7$ | 0.16 | $7.30 \times 10^7$ | 0.05 |
| −10 | $2.93 \times 10^7$ | 0.19 | $3.19 \times 10^7$ | 0.17 | $3.04 \times 10^7$ | 0.19 | $7.05 \times 10^7$ | 0.05 |
| 0 | $2.29 \times 10^7$ | 0.23 | $2.67 \times 10^7$ | 0.19 | $2.43 \times 10^7$ | 0.23 | $6.72 \times 10^7$ | 0.06 |
| 10 | $1.69 \times 10^7$ | 0.29 | $2.17 \times 10^7$ | 0.23 | $1.81 \times 10^7$ | 0.30 | $6.32 \times 10^7$ | 0.07 |
| 20 | $1.14 \times 10^7$ | 0.36 | $1.68 \times 10^7$ | 0.27 | $1.25 \times 10^7$ | 0.38 | $5.85 \times 10^7$ | 0.08 |
| 30 | $6.97 \times 10^6$ | 0.45 | $1.24 \times 10^7$ | 0.33 | $7.73 \times 10^6$ | 0.48 | $5.26 \times 10^7$ | 0.10 |
| 40 | $4.20 \times 10^6$ | 0.52 | $8.74 \times 10^6$ | 0.38 | $4.30 \times 10^6$ | 0.56 | $4.56 \times 10^7$ | 0.13 |
| 50 | $2.44 \times 10^6$ | 0.57 | $6.02 \times 10^6$ | 0.44 | $1.87 \times 10^6$ | 0.66 | $3.78 \times 10^7$ | 0.17 |
| 60 | $1.37 \times 10^6$ | 0.62 | $4.04 \times 10^6$ | 0.48 | $7.84 \times 10^5$ | 0.71 | $2.89 \times 10^7$ | 0.24 |
| 70 | $7.62 \times 10^5$ | 0.66 | $2.71 \times 10^6$ | 0.51 | $4.60 \times 10^5$ | 0.70 | $2.03 \times 10^7$ | 0.33 |
| 80 | $4.36 \times 10^5$ | 0.68 | $1.79 \times 10^6$ | 0.52 | $3.04 \times 10^5$ | 0.66 | $1.30 \times 10^7$ | 0.46 |
| 90 | $2.78 \times 10^5$ | 0.67 | $1.19 \times 10^6$ | 0.51 | $2.18 \times 10^5$ | 0.62 | $7.51 \times 10^6$ | 0.62 |
| 100 | $1.86 \times 10^5$ | 0.66 | $8.26 \times 10^5$ | 0.48 | $1.62 \times 10^5$ | 0.57 | $4.34 \times 10^6$ | 0.75 |
| 110 | $1.33 \times 10^5$ | 0.63 | $5.94 \times 10^5$ | 0.43 | $1.27 \times 10^5$ | 0.51 | $2.41 \times 10^6$ | 0.90 |
| 120 | $1.01 \times 10^5$ | 0.58 | $4.37 \times 10^5$ | 0.37 | $1.06 \times 10^5$ | 0.43 | $1.35 \times 10^6$ | 1.02 |
| 130 | $8.01 \times 10^4$ | 0.52 | $3.23 \times 10^5$ | 0.30 | $9.28 \times 10^4$ | 0.35 | $7.49 \times 10^5$ | 1.13 |
| 140 | $6.93 \times 10^4$ | 0.43 | $2.27 \times 10^5$ | 0.23 | $8.75 \times 10^4$ | 0.26 | $4.05 \times 10^5$ | 1.23 |
| 150 | $6.54 \times 10^4$ | 0.32 | $1.31 \times 10^5$ | 0.17 | $8.65 \times 10^4$ | 0.18 | $2.03 \times 10^5$ | 1.31 |
| 160 | $6.62 \times 10^4$ | 0.23 | $5.65 \times 10^4$ | 0.12 | $8.87 \times 10^4$ | 0.12 | $9.92 \times 10^4$ | 1.32 |
| 170 | $6.87 \times 10^4$ | 0.17 | $4.01 \times 10^4$ | 0.09 | $8.64 \times 10^4$ | 0.11 | $4.86 \times 10^4$ | 1.20 |
| 180 | $7.11 \times 10^4$ | 0.14 | $3.64 \times 10^4$ | 0.08 | $7.37 \times 10^4$ | 0.09 | $2.42 \times 10^4$ | 0.98 |
| 190 | — | — | $3.02 \times 10^4$ | 0.06 | — | — | — | — |

The data in Table 4 demonstrate that the vibration damping materials of Examples 1 and 10–12, which were prepared using curable polydimethylsiloxane oligourea segmented copolymers derived from polydimethylsiloxane diamines of 5280 molecular weight and various diisocyanates, had useful temperature ranges of 30 to 85° C., 46 to 115° C., 32 to 77° C., and 91 to 142° C., respectively.

Examples 13–15

In Example 13, a polydimethylsiloxane oligourea segmented copolymer was made 99.6 parts Polydimethylsiloxane Diamine D, Lot 2, molecular weight 37,800 and 0.4 parts ESACURE™ KB-1 free radical initiator, available from Sartomer Co., Exton, Pa., were fed at a rate of 3.58 g/min (0.000189 equivalents amine/min) into the first zone of an 18 mm counter-rotating twin screw extruder (available from Leistritz Corporation, Allendale, N.J.), MQ silicate resin powder whose toluene content was less than 0.1 percent, as determined by loss in weight upon heating the silicate resin under vacuum at 60° C. for 16 hours, was fed at a rate of 4.3 g/min into the second zone. A mixture of 62.8 parts methylenedicyclohexylene-4,4'-diisocyanate and 37.2 parts isocyanatoethyl methacrylate were fed at a rate of 0.026 g/min (0.000186 equivalents isocyanate/min) into the fourth zone. The extruder had a 40:1 length:diameter ratio and double-start fully intermeshing screws throughout the entire length of the barrel, rotating at 100 revolutions per minute. The temperature profile for each of the 90 mm long zones was: zone 1 to 4—50° C.; zone 5—95° C.; zone 6—170° C.; zone 7—180° C.; zone 8—125° C.; and endcap—120° C. Zone seven was vacuum vented. The resultant polymer was extruded, cooled in air, and collected.

A portion of the resulting polydimethylsiloxane oligourea segmented copolymer was coated and cured as in Example 1 to provide a pressure-sensitive adhesive tape.

Another portion of the copolymer was pressed between two release liners into a uniform sample of approximately 1 mm thickness, and cured by exposure to low intensity UV lights to form a cured vibration damping material.

In Example 14, a polydimethylsiloxane oligourea segmented copolymer was prepared as in Example 13, except a mixture of 83.5 parts by weight methylenedicyclohexylene-4,4'-diisocyanate and 16.5 parts by weight isocyanatoethyl methacrylate were fed at a rate 0.0249 g/min (0.000185 equivalents isocyanate/min) was fed into the fourth zone, zone 6 was 180° C., and zone 8 and the endcap were 150° C. The resulting polydimethylsiloxane oligourea segmented copolymer was coated and cured as in Example 1 to form a pressure-sensitive adhesive tape.

In Example 15, a polydimethylsiloxane oligourea segmented copolymer was prepared as in Example 1, except 100 parts (2.96 mmoles) Polydimethylsiloxane Diamine D, Lot 3, molecular weight 34,800 was dissolved in 99 parts toluene was substituted for Diamine A, and a mixture of 0.66 parts (2.35 mmoles) of methylenedicyclohexylene-4,4'-diisocyanate and 0.13 parts (0.84 mmoles) isocyanatoethyl methacrylate in 65 parts toluene and 2 parts 2-propanol was used to prepare polydimethylsiloxane oligourea segmented copolymer. Then, the copolymer solution was added SR-545 silicate resin solution to achieve 120 parts (based on dry weight) per 100 parts polydimethylsiloxane oligourea segmented copolymer (based on dry weight). To the copolymer/resin solution was added 1 part DAROCUR™ 1173 (a photoinitiator available from Ciba-Geigy, Hawthorne, N.Y.) per 100 parts of copolymer/resin blend solids, and the solution was subsequently air dried on a release liner film.

A portion of the resulting polydimethylsiloxane oligourea segmented copolymer was coated and cured as in Example 1 to form a pressure-sensitive adhesive tape.

Another portion of the solution was pressed between two release liners into a uniform sample of approximately 1 mm thickness, and cured by exposure to low intensity UV lights to form a cured vibration damping material.

The pressure-sensitive adhesive tapes of Examples 13–15 were tested for 180° peel adhesion to glass and for shear strength to stainless steel. The results as well thickness and average degree of polymerization are reported together in Table 5, along with the data for Example 6 that was made using the same reactants.

The storage modulus, G', and tan δ were determined for the vibration damping materials of Examples 13 and 15, having an average degree of polymerization of 2 and 7, respectively. The results are set forth in Table 6 together with those for Example 4, a similar composition having an average degree of polymerization 3.

TABLE 5

| Example | Degree of Polymerization | Thickness (μm) | 180° Peel adhesion (N/dm) | Shear strength (min) |
|---|---|---|---|---|
| 13 | 2 | 62 | 48 | 1160 popoff |
| 6 | 3 | 50 | 85 | 3000 popoff |
| 14 | 5 | 150 | 131 | 5480 popoff |
| 15 | 7 | 75 | 61 | 700 popoff |

The data in Table 5 demonstrates pressure-sensitive adhesive tapes can be prepared using adhesives with polydimethylsiloxane oligourea segmented copolymers with varying degrees of polymerization, from 2 to 7, have good adhesive properties.

TABLE 6

| Temp | Example 4 | | Example 13 | | Example 15 | |
|---|---|---|---|---|---|---|
| (° C.) | G' (Pa) | Tan δ | G' (Pa) | Tan δ | G' (Pa) | Tan δ |
| −90 | $9.98 \times 10^7$ | 0.04 | $7.79 \times 10^7$ | 0.05 | $7.56 \times 10^7$ | 0.04 |
| −80 | $8.92 \times 10^7$ | 0.05 | $6.92 \times 10^7$ | 0.06 | $6.59 \times 10^7$ | 0.06 |
| −70 | $7.73 \times 10^7$ | 0.07 | $5.87 \times 10^7$ | 0.09 | $5.40 \times 10^7$ | 0.1 |
| −60 | $6.22 \times 10^7$ | 0.12 | $4.74 \times 10^7$ | 0.14 | $4.34 \times 10^7$ | 0.15 |
| −50 | $5.24 \times 10^7$ | 0.15 | $3.80 \times 10^7$ | 0.19 | $3.37 \times 10^7$ | 0.2 |
| −40 | $4.31 \times 10^7$ | 0.19 | $2.94 \times 10^7$ | 0.25 | $2.46 \times 10^7$ | 0.26 |
| −30 | $3.20 \times 10^7$ | 0.26 | $2.01 \times 10^7$ | 0.35 | $1.60 \times 10^7$ | 0.37 |
| −20 | $2.15 \times 10^7$ | 0.35 | $1.03 \times 10^7$ | 0.55 | $8.65 \times 10^6$ | 0.54 |
| −10 | $1.49 \times 10^7$ | 0.44 | $5.33 \times 10^6$ | 0.71 | $4.87 \times 10^6$ | 0.7 |
| 0 | $9.06 \times 10^6$ | 0.57 | $3.46 \times 10^6$ | 0.74 | $2.59 \times 10^6$ | 0.81 |
| 10 | $5.49 \times 10^6$ | 0.68 | $2.31 \times 10^6$ | 0.74 | $1.27 \times 10^6$ | 0.9 |
| 20 | $3.48 \times 10^6$ | 0.75 | $1.48 \times 10^6$ | 0.73 | $6.72 \times 10^5$ | 0.91 |
| 30 | $2.17 \times 10^6$ | 0.77 | $9.59 \times 10^5$ | 0.71 | $3.50 \times 10^5$ | 0.84 |
| 40 | $1.37 \times 10^6$ | 0.79 | $6.53 \times 10^5$ | 0.68 | $2.03 \times 10^5$ | 0.72 |
| 50 | $8.49 \times 10^5$ | 0.79 | $4.41 \times 10^5$ | 0.65 | $1.32 \times 10^5$ | 0.61 |
| 60 | $5.44 \times 10^5$ | 0.76 | $3.06 \times 10^5$ | 0.61 | $9.23 \times 10^4$ | 0.55 |
| 70 | $3.58 \times 10^5$ | 0.72 | $2.21 \times 10^5$ | 0.58 | $6.79 \times 10^4$ | 0.53 |
| 80 | $2.42 \times 10^5$ | 0.67 | $1.62 \times 10^5$ | 0.56 | $5.08 \times 10^4$ | 0.53 |
| 90 | $1.75 \times 10^5$ | 0.64 | $1.20 \times 10^5$ | 0.55 | $3.96 \times 10^4$ | 0.57 |
| 100 | $1.27 \times 10^5$ | 0.61 | $9.21 \times 10^4$ | 0.56 | $2.85 \times 10^4$ | 0.64 |

TABLE 6-continued

| Temp | Example 4 | | Example 13 | | Example 15 | |
|---|---|---|---|---|---|---|
| (° C.) | G' (Pa) | Tan δ | G' (Pa) | Tan δ | G' (Pa) | Tan δ |
| 110 | $9.62 \times 10^4$ | 0.60 | $7.01 \times 10^4$ | 0.56 | $2.03 \times 10^4$ | 0.76 |
| 120 | $7.33 \times 10^4$ | 0.60 | $5.47 \times 10^4$ | 0.56 | $1.38 \times 10^4$ | 0.83 |
| 130 | $5.54 \times 10^4$ | 0.60 | $4.29 \times 10^4$ | 0.58 | $8.15 \times 10^3$ | 0.99 |
| 140 | $4.09 \times 10^4$ | 0.60 | $3.42 \times 10^4$ | 0.55 | $5.67 \times 10^3$ | 1.09 |
| 150 | $3.31 \times 10^4$ | 0.59 | $3.03 \times 10^4$ | 0.52 | $5.94 \times 10^3$ | 0.94 |
| 160 | $2.69 \times 10^4$ | 0.57 | $2.88 \times 10^4$ | 0.5 | $6.34 \times 10^3$ | 0.81 |
| 170 | $2.23 \times 10^4$ | 0.55 | $2.54 \times 10^4$ | 0.47 | $4.86 \times 10^3$ | 0.78 |
| 180 | $1.87 \times 10^4$ | 0.52 | $2.17 \times 10^4$ | 0.47 | — | — |
| 190 | — | — | $1.26 \times 10^4$ | 0.54 | — | — |

The data in Table 6 demonstrates that the vibration damping materials of Examples 3, 13, and 15, which were prepared using curable polydimethylsiloxane oligourea segmented copolymers of polydimethylsiloxane diamines of about 37,000 molecular weight and the same diisocyanates but with degrees of polymerization of 3, 2, and 7 respectively, had useful temperature ranges of 5 to 71° C., −14 to 57° C., and −16 to 30° C., respectively.

Examples 16–18

In Example 16, a polydimethylsiloxane oligourea segmented copolymer prepared as in Example 6 was hot melt coated with a 1.91 cm diameter (¾ inch) single screw Haake extruder (commercially available from Haake, Inc., Saddlebrook, N.J. 07662) rotating at 40 revolutions per minute with a temperature profile of: zone 1—not controlled, zone 2—163° C., zone 3—188° C., and necktube and die (12.7 cm wide )—210° C., cast between nip rolls with a 35.6 μm (1.4 mil) polyethylene terephthalate film on one roll and S TAKE-OFF™ release liner on the other to a coating thickness of about 25 μm (1.0 mil), and, subsequently, exposed to 1.73 mW for 20 minutes ultraviolet radiation provided by a low intensity ultraviolet lamp Model F40BL, available from General Electric Co. to effect curing.

In Example 17, Polydimethylsiloxane Diamine D, Lot 3, molecular weight 34,800, was added the first zone of an 18 mm co-rotating twin screw extruder having a 40:1 length-:diameter ratio (available from Leistritz Corporation, Allendale, N.J.) at a rate of 6.23 g/min (0.000358 equivalents amine/min). MQ resin dried to about 1% toluene, obtained from GE Silicones as experimental #1170-002, was fed into zone 2 at a rate of 8.27 g/min. A mixture of 27.5 parts by weight methylenedicyclohexylene-4,4'-diisocyanate, 16.3 parts by weight isocyanatoethyl methacrylate, and 56.3 parts DAROCUR™ 1173 was fed into the fifth zone at a rate of 0.105 g/min (0.000330 equivalents isocyanate/min). The feed line of this stream was placed close to the screw threads. The extruder had double-start fully intermeshing screws throughout the entire length of the barrel, rotating at 300 revolutions per minute. The temperature profile for each of the 90 mm long zones was: zones 1 and 2—30° C.; zone 3—35° C.; zone 4—50° C.; zone 5—60° C.; zone 6—75° C.; zone 7—90° C.; zone 8—110° C.; and endcap—120° C. The extrudate was cooled in air. The resulting polydimethylsiloxane oligourea segmented copolymer was coated and cured as in Example 16 to produce a pressure-sensitive adhesive tape.

In Example 18, Polydimethylsiloxane Diamine D, Lot 3, molecular weight 34,800, was added the first zone of an 18 mm co-rotating twin screw extruder having a 40:1 length-:diameter ratio (available from Leistritz Corporation, Allendale, N.J.) at a rate of 6.23 g/min (0.000358 equivalents amine/min). MQ resin dried to about 1% toluene, obtained from GE Silicones as experimental #1170-002, was fed into zone 2 at a rate of 8.6 g/min. A mixture of 27.5 parts by weight methylenedicyclohexylene-4,4'-diisocyanate, 16.3 parts by weight isocyanatoethyl methacrylate, and 56.3 parts DAROCUR™ 1173 was fed into the fifth zone at a rate of 0.106 g/min (0.000333 equivalents isocyanate/min). The feed line of this stream was placed close to the screw threads. The extruder had double-start fully intermeshing screws throughout the entire length of the barrel, rotating at 300 revolutions per minute. The temperature profile for each of the 90 mm long zones was: zones 1 and 2—34° C.; zone 3—40° C.; zone 4—50° C.; zone 5—60° C.; zone 6—75° C.; zone 7—90° C.; zone 8—110° C.; and endcap—120° C. The extrudate was cooled in air. The resulting polydimethylsiloxane oligourea segmented copolymer was coated and cured as in Example 16 to produce a pressure-sensitive adhesive tape.

The pressure-sensitive adhesive tapes of Examples 16–18 on which the adhesive thickness was 25 μm (1 mil) were tested for 180° peel adhesion to glass and shear strength on stainless steel. The results are set forth in Table 7.

TABLE 7

| Example | Copolymer/resin Ratio | 180° Peel Adhesion (N/dm) | Shear Strength (min) |
|---|---|---|---|
| 16 | 1/1.2 | 55 | 1900 pop off |
| 17 | 1/1.3 | 65 | 5900 pop off |
| 18 | 1/1.4 | 63 | 5700 pop off |

The data in Table 7 demonstrates that polydimethylsiloxane oligourea segmented copolymer pressure-sensitive adhesive compositions of the invention which were made by a solventless process, hot-melt processed using conventional equipment, and ultraviolet radiation cured had good adhesive properties.

Examples 19–26

In Examples 19–26, polydimethylsiloxane oligourea segmented copolymers were prepared as follows. Polydimethylsiloxane Oligourea Segmented Copolymer A was dissolved in toluene and mixed with varying amounts of SR-545 MQ silicate resin solution containing DAROCUR™ 1173 under slow agitation as in Example 5. For each 10 parts of Copolymer A, the following amounts of silicate resin were used: Example 19—5 parts; Example 20—8 parts; Example 21—10 parts; Example 22—13 parts; Example 23—14 parts; Example 24—15 parts; Example 25—17 parts; and Example 26—23 parts. The resulting compositions were coated and cured as in Example 1 to provide pressure-sensitive adhesive tapes.

Other portions of Examples 20 and 26 were each poured onto a release liner, dried, pressed between two release liners into a uniform sample of approximately 1 mm thickness, and cured by exposure to low intensity UV lights to form a cured vibration damping material.

The 180° peel adhesion to glass and the shear strength to stainless steel determined for each pressure-sensitive adhesive tape of Examples 19–26, the thickness of the tape of Example 19 being 62 μm while the thickness of the others was 50 μm. The maximum tan δ at 10 Hz was determined for Examples 20–26. The results are set forth in Table 8.

TABLE 8

| Example | 180° Peel adhesion (N/dm) | Shear strength (min) | Max tan δ (° C.) |
|---|---|---|---|
| 19 | 2 | 7 popoff | — |
| 20 | 24 | 720 popoff | −10 |
| 21 | 46 | 5500 popoff | 15 |
| 22 | 73 | 1900 popoff | 35 |
| 23 | 73 | >10000 | 60 |
| 24 | 79 | >10000 | 65 |
| 25 | — | >5000 | 60 |
| 26 | — | >5000 | >120 |

The data in table 8 demonstrates that at low silicate resin content the polydimethylsiloxane oligourea segmented copolymer pressure-sensitive adhesive compositions show marginal adhesive performance, while at high silicate resin content, partial two-bond failure occurred (Example 24) or total two-bond failure occurred (Examples 25–26), that is, the adhesive adhered to the glass better than to the tape backing. Adhesion to the backing is problematic, although high peel adhesion to glass and good shear properties are observed.

The shear creep viscosity of the uncured compositions of Examples 20–21, 6, and 22–24 was measured as a function of temperature using Rheometrics DSR in a Step Stress Mode (creep). The results as well as the ratio of copolymer/resin are set forth in Table 9.

TABLE 9

| | Shear Creep Viscosity (Pa · s) | | | | | |
|---|---|---|---|---|---|---|
| Temp (° C.) | Ex. 20 1/0.8 | Ex. 21 1/1 | Ex. 6 1/1.2 | Ex. 22 1/1.3 | Ex. 23 1/1.4 | Ex. 24 1/1.5 |
| 25 | $1.78 \times 10^5$ | $4.71 \times 10^5$ | $1.46 \times 10^6$ | $1.94 \times 10^6$ | $4.84 \times 10^7$ | $1.29 \times 10^7$ |
| 35 | — | $1.54 \times 10^5$ | $6.18 \times 10^5$ | $9.53 \times 10^5$ | $3.19 \times 10^6$ | $4.21 \times 10^6$ |
| 45 | $4.21 \times 10^4$ | $5.92 \times 10^4$ | $2.28 \times 10^5$ | $3.43 \times 10^5$ | $9.80 \times 10^5$ | $1.81 \times 10^6$ |
| 50 | — | — | $1.23 \times 10^5$ | $1.78 \times 10^5$ | $5.21 \times 10^5$ | $1.06 \times 10^6$ |
| 60 | $8.21 \times 10^3$ | $1.37 \times 10^4$ | $4.11 \times 10^4$ | $5.20 \times 10^4$ | $1.37 \times 10^5$ | $2.88 \times 10^5$ |
| 70 | — | $5.14 \times 10^3$ | $1.42 \times 10^4$ | $1.71 \times 10^4$ | $3.56 \times 10^4$ | $8.26 \times 10^4$ |
| 80 | $1.03 \times 10^3$ | $2.24 \times 10^3$ | $5.65 \times 10^3$ | $6.29 \times 10^3$ | $1.20 \times 10^4$ | $2.87 \times 10^4$ |
| 90 | — | $9.50 \times 10^2$ | $2.46 \times 10^3$ | $2.52 \times 10^3$ | $4.40 \times 10^3$ | $9.03 \times 10^3$ |
| 100 | — | $5.08 \times 10^2$ | $9.25 \times 10^2$ | $1.07 \times 10^3$ | $1.57 \times 10^3$ | $3.38 \times 10^3$ |

The data in Table 9 demonstrates the effect of temperature on shear creep viscosity of the polydimethylsiloxane oligourea segmented copolymer pressure-sensitive adhesive compositions of Examples 5 and 20–24. The low shear creep viscosities at moderate temperatures are indicative of compositions which are excellent for hot-melt coating.

The storage modulus and tan δ were determined for the vibration damping materials of Examples 20 and 26. The results are set forth in Table 10, together with those for Example 4, a similar composition containing 54.5 percent MQ silicate resin.

TABLE 10

| Temp | Example 4 | | Example 20 | | Example 26 | |
|---|---|---|---|---|---|---|
| (° C.) | G' (Pa) | Tan δ | G' (Pa) | Tan δ | G' (Pa) | Tan δ |
| −90 | $9.98 \times 10^7$ | 0.04 | $5.48 \times 10^7$ | 0.10 | $7.68 \times 10^7$ | 0.02 |
| −80 | $8.92 \times 10^7$ | 0.05 | $4.13 \times 10^7$ | 0.12 | $7.30 \times 10^7$ | 0.02 |
| −70 | $7.73 \times 10^7$ | 0.07 | $2.91 \times 10^7$ | 0.17 | $6.81 \times 10^7$ | 0.03 |
| −60 | $6.22 \times 10^7$ | 0.12 | $1.84 \times 10^7$ | 0.27 | $6.44 \times 10^7$ | 0.04 |
| −50 | $5.24 \times 10^7$ | 0.15 | $8.99 \times 10^6$ | 0.45 | $6.04 \times 10^7$ | 0.05 |
| −40 | $4.31 \times 10^7$ | 0.19 | $4.22 \times 10^6$ | 0.61 | $5.65 \times 10^7$ | 0.05 |
| −30 | $3.20 \times 10^7$ | 0.26 | $2.18 \times 10^6$ | 0.66 | $5.26 \times 10^7$ | 0.06 |
| −20 | $2.15 \times 10^7$ | 0.35 | $1.26 \times 10^6$ | 0.64 | $4.80 \times 10^7$ | 0.08 |
| −10 | $1.49 \times 10^7$ | 0.44 | $8.59 \times 10^5$ | 0.60 | $4.44 \times 10^7$ | 0.09 |
| 0 | $9.06 \times 10^6$ | 0.57 | $5.74 \times 10^5$ | 0.56 | $3.96 \times 10^7$ | 0.11 |
| 10 | $5.49 \times 10^6$ | 0.68 | $3.98 \times 10^5$ | 0.51 | $3.42 \times 10^7$ | 0.14 |
| 20 | $3.48 \times 10^6$ | 0.75 | $2.96 \times 10^5$ | 0.48 | $2.84 \times 10^7$ | 0.18 |
| 30 | $2.17 \times 10^6$ | 0.77 | $2.21 \times 10^5$ | 0.45 | $2.23 \times 10^7$ | 0.23 |
| 40 | $1.37 \times 10^6$ | 0.79 | $1.68 \times 10^5$ | 0.44 | $1.59 \times 10^7$ | 0.31 |
| 50 | $8.49 \times 10^5$ | 0.79 | $1.31 \times 10^5$ | 0.43 | $9.67 \times 10^6$ | 0.46 |
| 60 | $5.44 \times 10^5$ | 0.76 | $1.04 \times 10^5$ | 0.44 | $4.66 \times 10^6$ | 0.71 |
| 70 | $3.58 \times 10^5$ | 0.72 | $8.01 \times 10^4$ | 0.46 | $2.16 \times 10^6$ | 1.01 |
| 80 | $2.42 \times 10^5$ | 0.67 | $6.33 \times 10^4$ | 0.48 | $6.25 \times 10^5$ | 1.45 |
| 90 | $1.75 \times 10^5$ | 0.64 | $4.74 \times 10^4$ | 0.51 | $1.75 \times 10^5$ | 2.01 |
| 100 | $1.27 \times 10^5$ | 0.61 | $3.71 \times 10^4$ | 0.55 | $5.41 \times 10^4$ | 2.35 |
| 110 | $9.62 \times 10^4$ | 0.60 | $2.78 \times 10^4$ | 0.58 | $2.17 \times 10^4$ | 2.40 |
| 120 | $7.33 \times 10^4$ | 0.60 | $2.03 \times 10^4$ | 0.59 | $9.14 \times 10^3$ | 2.63 |
| 130 | $5.54 \times 10^4$ | 0.60 | $1.59 \times 10^4$ | 0.62 | — | — |
| 140 | $4.09 \times 10^4$ | 0.60 | $1.26 \times 10^4$ | 0.59 | — | — |
| 150 | $3.31 \times 10^4$ | 0.59 | $1.28 \times 10^4$ | 0.56 | — | — |
| 160 | $2.69 \times 10^4$ | 0.57 | $1.31 \times 10^4$ | 0.49 | — | — |
| 170 | $2.23 \times 10^4$ | 0.55 | $1.41 \times 10^4$ | 0.42 | — | — |
| 180 | $1.87 \times 10^4$ | 0.52 | $1.19 \times 10^4$ | 0.40 | — | — |

As can be seen from the data in Table 10, Examples 20, 4, and 26, having increasingly higher MQ silicate resin concentrations of 44.4, 54.5, and 70 weight percent, respectively, caused the useful temperature range to increase from −47 to 15° C. in Example 20, 5 to 71° C. in Example 4, 55 to 85° C. in Example 26.

Example 27

In Example 27, a pressure-sensitive adhesive was prepared as in Example 6. After the adhesive was extruded, cooled and collected, 49.7 parts of adhesive and 50.3 parts toluene were blended and coated on to a primed polyester backing using a knife coater, dried in an air circulating oven at 60° C. for 10 minutes, laminated with a release liner and cured at 1.73 mW for 20 minutes under low intensity ultraviolet lights to provide a dry adhesive thickness of 100 μm (4 mils). The 180° C. peel adhesion from glass was 70 N/dm and the shear strength on stainless steel was >5000 min.

Example 28

In Example 28, a composition was prepared as in Example 1, except 100.3 parts (10.4 mmoles) Polydiphenyldimethylsiloxane Diamine F, molecular weight 9620 was dissolved in 94 parts toluene and substituted for the Diamine A, and a mixture of 1.82 parts (6.95 mmoles) of methylenedicyclohexylene-4,4'-diisocyanate and 1.08 parts (6.95 mmoles) of isocyanatoethyl methacrylate dissolved in 57 parts toluene was used to prepare polydimethyldiphenylsiloxane oligourea segmented copolymer. To the solution was added 25 parts SR-545 silicate resin solution per 100 parts polydimethyldiphenylsiloxane oligourea segmented copolymer, and 1 part DAROCUR™ 1173 per parts of copolymer/resin blend solids.

A portion of the solution was subsequently air dried, coated, and cured as in Example 1. The 180° C. peel adhesion to glass and the shear strength on stainless steel were determined and were, respectively, 58 N/dm and >3000 min.

Another portion of the solution was pressed between two release liners into a uniform sample of approximately 1 mm thickness, and cured by exposure to low intensity UV lights to form a cured vibration damping material.

The storage modulus, G', and tan δ were determined for the vibration damping material of Example 28 and the results are reported in Table 11.

TABLE 11

| Temp | Example 28 | |
|---|---|---|
| (° C.) | G' (Pa) | Tan δ |
| −90 | $8.61 \times 10^7$ | 0.08 |
| −80 | $1.96 \times 10^7$ | 0.56 |
| −70 | $2.30 \times 10^6$ | 0.65 |
| −60 | $8.16 \times 10^5$ | 0.35 |
| −50 | $5.66 \times 10^5$ | 0.18 |
| −40 | $4.89 \times 10^5$ | 0.11 |
| −30 | $4.60 \times 10^5$ | 0.07 |
| −20 | $4.47 \times 10^5$ | 0.06 |
| −10 | $4.43 \times 10^5$ | 0.06 |
| 0 | $4.38 \times 10^5$ | 0.06 |
| 10 | $4.27 \times 10^5$ | 0.06 |
| 20 | $4.16 \times 10^5$ | 0.08 |
| 30 | $3.96 \times 10^5$ | 0.11 |
| 40 | $3.63 \times 10^5$ | 0.15 |
| 50 | $3.21 \times 10^5$ | 0.19 |
| 60 | $2.75 \times 10^5$ | 0.21 |
| 70 | $2.34 \times 10^5$ | 0.22 |
| 80 | $2.02 \times 10^5$ | 0.20 |
| 90 | $1.79 \times 10^5$ | 0.18 |
| 100 | $1.63 \times 10^5$ | 0.14 |
| 110 | $1.53 \times 10^5$ | 0.11 |
| 120 | $1.43 \times 10^5$ | 0.09 |
| 130 | $1.36 \times 10^5$ | 0.07 |
| 140 | $1.33 \times 10^5$ | 0.05 |
| 150 | $1.31 \times 10^5$ | 0.04 |
| 160 | $1.30 \times 10^5$ | 0.03 |
| 170 | $1.29 \times 10^5$ | 0.03 |
| 180 | $1.24 \times 10^5$ | 0.04 |
| 190 | $1.11 \times 10^5$ | 0.04 |

As can be seen from the data in Table 11, the vibration damping material of Example 28, containing 20 percent MQ silicate resin, and based on a curable polydimethyldiphenylsiloxane oligourea segmented copolymer derived from polydimethyldiphenylsiloxane diamine of molecular weight 9620, had a storage modulus utility window, G', of −75 to 45° C., a loss factor, tan δ, utility window of −82 to −62° C., and a useful temperature range of −75 to −62° C.

Example 29

In Example 29, a vibration damping material was formulated by dissolving 10 parts Polydimethylsiloxane Oligourea Segmented Copolymer A in toluene and adding MQD silicate resin solution MQR-32-3 (70 weight percent in toluene, available from Shin-Etsu Silicones of America, Inc., Torrance, Calif.) to provide 400 parts silicate resin (based on dry weight) per 100 parts copolymer (based on dry weight). To this copolymer/resin solution was added 1.0 part DAROCUR™ 1173 per 100 parts of copolymer/resin blend solids. The sample was dried, then well mixed in a 50 gram mixing head at 75 rpm and a temperature of 150° C. for 10 minutes on a mixer (available from C.W. Brabender Instruments, Inc., South Hackensack, N.J.). The mixed sample was pressed, cured, and tested as in Example 1 to provide a vibration damping material. The storage modulus and tan δ were determined for Example 29. The results are set forth in Table 12.

TABLE 12

| Temp | Example 29 | |
|---|---|---|
| (° C.) | G' (Pa) | Tan δ |
| −90 | $7.90 \times 10^7$ | 0.02 |
| −80 | $7.54 \times 10^7$ | 0.02 |
| −70 | $7.11 \times 10^7$ | 0.03 |
| −60 | $6.69 \times 10^7$ | 0.05 |
| −50 | $6.07 \times 10^7$ | 0.06 |
| −40 | $5.49 \times 10^7$ | 0.08 |
| −30 | $4.81 \times 10^7$ | 0.10 |
| −20 | $4.14 \times 10^7$ | 0.13 |
| −10 | $3.61 \times 10^7$ | 0.15 |
| 0 | $2.94 \times 10^7$ | 0.19 |
| 10 | $2.21 \times 10^7$ | 0.27 |
| 20 | $1.38 \times 10^7$ | 0.42 |
| 30 | $6.52 \times 10^6$ | 0.67 |
| 40 | $3.33 \times 10^6$ | 0.85 |
| 50 | $1.68 \times 10^6$ | 0.98 |
| 60 | $9.61 \times 10^5$ | 1.06 |
| 70 | $4.99 \times 10^5$ | 1.15 |
| 80 | $2.66 \times 10^5$ | 1.27 |
| 90 | $1.27 \times 10^5$ | 1.44 |
| 100 | $5.60 \times 10^4$ | 1.69 |
| 110 | $2.01 \times 10^4$ | 1.99 |
| 120 | $7.06 \times 10^3$ | 1.94 |
| 130 | $3.61 \times 10^3$ | 1.38 |
| 140 | $2.04 \times 10^3$ | 0.90 |
| 150 | $1.11 \times 10^3$ | 1.10 |

The data in Table 12 demonstrate that Example 29, a cured vibration damping composition of the present invention, formulated at a silicate resin concentration of 80 percent provides a useful temperature range of 29 to 77° C.

Example 30

In Example 30, Polydimethylsiloxane Diamine B, molecular weight 10,700, was fed into the third zone of an 18 mm co-rotating twin screw extruder having a 40:1 length:diameter ratio (available from Leistritz Corporation, Allendale, N.J.) at a rate of 6.63 g/min (0.000620 equivalents amine/min). A mixture of 32.9 parts by weight tetramethyl-m-xylylene diisocyanate, 32.2 parts by weight isocyanatopropyltriethoxy silane, 33.8 parts by weight octyl triethoxy silane, and 1.0 parts by weight dibutyl tin dilaurate was fed into the third zone at a rate of 0.298 g/min (0.00120 equivalents isocyanate/min). The feed line of this stream was placed close to the screw threads. MQ resin dried from solvent to about 1.3% toluene (obtained from General Electric Silicones as experimental material #1170-002) was fed to zone 5 at a rate of 10 g/min. The extruder had double-start fully intermeshing screws throughout the-entire length of the barrel, rotating at 300 revolutions per minute. The temperature profile for each of the 90 mm zones was: zones 1 through 3—30° C.; zone 4—35° C.; zone 5—45° C.; zone 6—80° C.; zone 7—90° C.; zone 8 and endcap—120° C. Zone seven was vacuum vented to remove entrained air. The MQ silicate resin had not incorporated uniformly into the polydiorganosiloxane oligourea segmented copolymer.

Thirty parts by weight of this copolymer blend was dissolved in 70 parts tetrahydrofuran, then coated onto a primed 38 μm (1.5 mil) thick polyester film and dried at 65° C. for 10 minutes to produce a 38 μm (1.5 mil) thick adhesive and allowed to cure for 1 week at 21° C. and 50% relative humidity.

The 180° peel adhesion to glass was tested and resulted in two-bond failure; the shear strength on stainless steel was >3000 minutes.

The storage modulus and tan δ were determined for Example 30 and the results are set forth in Table 13.

Example 31

In Example 31, 50 parts (0.287 mmol) Polydimethylsiloxane Diamine C, Lot 2, molecular weight 34,800, was dissolved in 50 parts toluene. To this solution with vigorous stirring was added 0.2 parts (0.181 mmol) aminopropyltriethoxysilane. 0.5 parts (0.382 mmol) methylenedicyclohexylene-4,4'-diisocyanate, 0.25 parts (0.439 mmol) trifluoroacetic acid catalyst, and 83.4 parts SR-545 MQ silicate resin. The solution was subsequently poured onto a release liner and dried at 65° C. for 20 minutes. The resultant polydimethylsiloxane oligourea segmented copolymer-based partially cured vibration damping material was allowed to cure at 21° C. and 50 percent relative humidity for 7 days to obtain a 0.2 mm thick sample of fully cured vibration damping material from which sections were laminated together, under nip pressure, to a total thickness of 1 mm.

The storage modulus and tan δ were determined for Example 31 and the results are set forth in Table 13.

TABLE 13

| Temp | Example 30 | | Example 31 | |
|---|---|---|---|---|
| (° C.) | G' (Pa) | Tan δ | G' (Pa) | Tan δ |
| −90 | $8.68 \times 10^7$ | 0.03 | $7.82 \times 10^7$ | 0.06 |
| −80 | $7.95 \times 10^7$ | 0.03 | $6.49 \times 10^7$ | 0.08 |
| −70 | $7.24 \times 10^7$ | 0.05 | $5.33 \times 10^7$ | 0.12 |
| −60 | $6.62 \times 10^7$ | 0.07 | $4.42 \times 10^7$ | 0.15 |
| −50 | $6.10 \times 10^7$ | 0.07 | $3.51 \times 10^7$ | 0.20 |
| −40 | $5.65 \times 10^7$ | 0.08 | $2.62 \times 10^7$ | 0.26 |
| −30 | $5.19 \times 10^7$ | 0.10 | $1.72 \times 10^7$ | 0.36 |
| −20 | $4.63 \times 10^7$ | 0.12 | $8.54 \times 10^6$ | 0.58 |
| −10 | $4.25 \times 10^7$ | 0.13 | $4.78 \times 10^6$ | 0.74 |
| 0 | $3.67 \times 10^7$ | 0.16 | $2.49 \times 10^6$ | 0.89 |
| 10 | $3.09 \times 10^7$ | 0.20 | $1.16 \times 10^6$ | 1.07 |
| 20 | $2.54 \times 10^7$ | 0.24 | $4.98 \times 10^5$ | 1.27 |
| 30 | $1.92 \times 10^7$ | 0.31 | $1.79 \times 10^5$ | 1.49 |
| 40 | $1.32 \times 10^7$ | 0.41 | $6.96 \times 10^4$ | 1.68 |
| 50 | $7.74 \times 10^6$ | 0.58 | $2.64 \times 10^4$ | 1.80 |
| 60 | $4.08 \times 10^6$ | 0.77 | $1.19 \times 10^4$ | 1.81 |
| 70 | $2.01 \times 10^6$ | 0.95 | $7.5 \times 10^3$ | 1.36 |
| 80 | $8.68 \times 10^5$ | 1.14 | $3.88 \times 10^3$ | 1.22 |
| 90 | $3.65 \times 10^5$ | 1.27 | $4.27 \times 10^3$ | 0.52 |
| 100 | $1.69 \times 10^5$ | 1.25 | — | — |
| 110 | $9.55 \times 10^4$ | 1.13 | — | — |
| 120 | $5.74 \times 10^4$ | 1.02 | — | — |
| 130 | $2.89 \times 10^4$ | 1.00 | — | — |
| 140 | $1.53 \times 10^4$ | 1.03 | — | — |

The data in Table 13 demonstrate that moisture cure vibration damping compositions Example 30 and 31 have useful temperature ranges of 52 to 91° C., and −16 to 24° C. respectively.

Example 32

The polydimethylsiloxane oligourea segmented copolymer of Example 32 was prepared as in Example 23, except the pressure-sensitive adhesive was coated from a 70° C. melt using a single screw Haake Rheocord extruder (commercially available from Haake, Inc., Saddlebrook, N.J. 07662), with a temperature profile set at zone 1—off, zone 2—66° C., zone 3—94° C., and die—94° C., at a thickness of 0.27 mm (10.5 mils) between a hook and loop fastener (SCOTCHMATE™ SJ-3418, commercially available from 3M Co., St. Paul, Minn.) and a clear, release liner film (S TAKE-OFF). The composition was cured by subjecting the composition to 1.73 mW for 20 minutes low intensity Ultraviolet (UV) radiation.

Samples were prepared and tested for 90° Peel Adhesion. After one day aging at room temperature, the peel adhesion was 1.44 kN/m and after the 1 day at room temperature plus 7 days at 70° C. (158° F.) aging, the peel adhesion was 1.68 kN/m, an increase of 17 percent. The data shows that the composition of the invention has good initial adhesion and no adhesion loss after exposure of the composition to elevated temperature. Also, −20° F. (−29° C.) shock resistance was determined by conditioning samples prepared as for the 90° Peel Adhesion in a −20° F. (−29° C.) freezer for 24 hours, and upon removal, immediately test for adhesion by hand. The samples did not fail and the adhesive appeared to still be rubbery (flexible and tough).

Additionally, samples were prepared and tested for Vertical Burn according to the test method described herein. The sample passed the Extinguish Time (15 seconds maximum) and the Burn Length (6 inches/15.2 cm maximum). The sample failed to meet the 3 second maximum Drip Extinguish Time. However, it is believed that the sample would pass with the addition of a small amount of non-halogen flame retardant.

Example 33

In Example 33, a vibration damping material was prepared as in Example 1, except a mixture of 67 parts (3.0 mmoles) Polydimethylsiloxane Diamine C, molecular weight 22,300, and 15.84 parts (3.0 mmoles) Polydimethylsiloxane Diamine A, molecular weight 5280, in 69 parts toluene, and a mixture of 0.98 parts (4.0 mmoles) of tetramethyl-m-xylylene diisocyanate and 0.62 parts (4.0 mmoles) of isocyanatoethyl methacrylate was used in the synthesis of this polydimethylsiloxane oligourea segmented copolymer. To this solution was added SR-545 silicate resin solution to achieve 120 parts silicate resin (based on dry weight) per 100 parts copolymer (based on dry weight). To this copolymer/resin solution was added 1.0 part DAROCUR™ per 100 parts of copolymer/resin blend solids. The solution was subsequently poured onto a release liner, dried, pressed between two release liners into a uniform sample of approximately 1 mm thickness, and cured by exposure to low intensity UV lights to form a cured vibration damping material.

The storage modulus and tan δ for Example 33 were determined and the result are set forth in Table 14.

TABLE 14

| Temp | Example 33 | |
|---|---|---|
| (° C.) | G' (Pa) | Tan δ |
| −90 | $7.71 \times 10^7$ | 0.04 |
| −80 | $6.72 \times 10^7$ | 0.06 |
| −70 | $5.67 \times 10^7$ | 0.08 |
| −60 | $4.91 \times 10^7$ | 0.10 |
| −50 | $4.14 \times 10^7$ | 0.13 |
| −40 | $3.32 \times 10^7$ | 0.17 |
| −30 | $2.53 \times 10^7$ | 0.23 |
| −20 | $1.76 \times 10^7$ | 0.30 |
| −10 | $1.25 \times 10^7$ | 0.38 |
| 0 | $7.59 \times 10^6$ | 0.50 |
| 10 | $4.67 \times 10^6$ | 0.57 |
| 20 | $2.76 \times 10^6$ | 0.62 |
| 30 | $1.58 \times 10^6$ | 0.67 |
| 40 | $9.22 \times 10^5$ | 0.67 |
| 50 | $5.27 \times 10^5$ | 0.68 |
| 60 | $3.03 \times 10^5$ | 0.69 |
| 70 | $1.75 \times 10^5$ | 0.68 |
| 80 | $1.12 \times 10^5$ | 0.66 |
| 90 | $7.38 \times 10^4$ | 0.62 |
| 100 | $5.14 \times 10^4$ | 0.58 |
| 110 | $3.72 \times 10^4$ | 0.51 |
| 120 | $2.80 \times 10^4$ | 0.39 |
| 130 | $2.35 \times 10^4$ | 0.29 |
| 140 | $1.68 \times 10^4$ | 0.26 |
| 150 | $1.02 \times 10^4$ | 0.18 |
| 160 | $8.02 \times 10^3$ | 0.06 |
| 170 | $5.99 \times 10^3$ | 0.12 |
| 180 | $3.51 \times 10^3$ | 0.04 |

The data in Table 14 demonstrate that a vibration damping composition of the present invention, formulated using a curable polydimethylsiloxane polyurea segmented copolymer prepared using a blend of two polydimethylsiloxane diamines having molecular weights of 5,280 and 22,300 provides a useful temperature range of 2 to 57° C.

Example 34

In Example 34, a vibration damping material was synthesized using the solventless process. A first free-radically curable vibration damping composition using Polydimethylsiloxane Diamine A and a second free-radically curable vibration damping composition using Polydimethylsiloxane Diamine C were prepared, and then combined in equal portions by weight in toluene solution.

To prepare the first composition, Polydimethylsiloxane Diamine A, molecular weight 5,280, was fed into the first zone of an 18 mm co-rotating twin screw extruder having a 40:1 length:diameter ratio (available from Leistritz Corporation, Allendale, N.J.) at a rate of 6.22 g/min (0.00236 equivalents amine/min). MQ silicate resin, containing 1% toluene, obtained from General Electric Silicone Products Division, Waterford, N.Y. as experimental material #1170-002 was fed into zone 2 at a rate of 7.6 g/min. A mixture of 50.8 parts by weight tetramethyl-m-xylylene diisocyanate, 32.3 parts by weight isocyanatoethyl methacrylate, and 33.9 parts by weight DAROCUR™ 1173 was fed into the sixth zone at a rate of 0.378 g/min (0.00236 equivalents isocyanate/min). The feed line of this stream was placed close to the screw threads. The extruder had double-start fully intermeshing screws throughout the entire length of the barrel, rotating at 200 revolutions per minute. The temperature profile for each of the 90 mm long zones was: zones 1 through 4—20 to 30° C.; zone 5—40° C.; zone 6—60° C.; zone 7—90° C.; zone 8—100° C.; and endcap—120° C. The extrudate was cooled in air, and collected.

To prepare the second composition, Polydimethylsiloxane Diamine C, molecular weight 22,300, was fed into the first zone of an 18 mm co-rotating twin screw extruder having a 40:1 length:diameter ratio (available from Leistritz Corporation, Allendale, N.J.) at a rate of 6.22 g/min (0.000558 equivalents amine/min). MQ silicate resin #1170-002, was fed into zone 2 at a rate of 7.56 g/min. A mixture of 33.3 parts by weight tetramethyl-m-xylylene diisocyanate, 21.1 parts by weight isocyanatoethyl methacrylate, and 45.6 parts by weight DAROCUR™ 1173 was fed into the sixth zone at a rate of 0.134 g/min (0.000549 equivalents isocyanate/min). The feed line of this stream was placed close to the screw threads. The extruder had double-start fully intermeshing screws throughout the entire length of the barrel, rotating at 50 revolutions per minute. The temperature profile for each of the 90 mm long zones was: zones 1 through 4—30° C.; zone 5—40° C.; zone 6—60° C.; zone 7—90° C.; zone 8 and endcap—120° C. The resultant polymer was extruded, cooled in air, and collected.

Equal weights of the two curable vibration damping compositions were dissolved in toluene. The solution was subsequently poured onto a release liner, dried, pressed between two release liners into a uniform sample of approximately 1 mm thickness, and cured by exposure to low intensity UV lights to form a cured vibration damping material.

The storage modulus and tan δ for Example 34 were determined and are set forth in Table 15.

TABLE 15

| Temp | Example 34 | |
|---|---|---|
| (° C.) | G' (Pa) | Tan δ |
| −90 | 7.60 × 10$^7$ | 0.04 |
| −80 | 6.77 × 10$^7$ | 0.05 |
| −70 | 5.76 × 10$^7$ | 0.07 |
| −60 | 4.98 × 10$^7$ | 0.09 |
| −50 | 4.34 × 10$^7$ | 0.11 |
| −40 | 3.79 × 10$^7$ | 0.13 |
| −30 | 3.26 × 10$^7$ | 0.15 |
| −20 | 2.72 × 10$^7$ | 0.18 |
| −10 | 2.37 × 10$^7$ | 0.19 |
| 0 | 1.95 × 10$^7$ | 0.23 |
| 10 | 1.55 × 10$^7$ | 0.27 |
| 20 | 1.18 × 10$^7$ | 0.32 |
| 30 | 8.35 × 10$^6$ | 0.39 |
| 40 | 5.84 × 10$^6$ | 0.45 |
| 50 | 4.09 × 10$^6$ | 0.50 |
| 60 | 2.65 × 10$^6$ | 0.56 |
| 70 | 1.71 × 10$^6$ | 0.60 |
| 80 | 1.06 × 10$^6$ | 0.62 |
| 90 | 6.65 × 10$^5$ | 0.62 |
| 100 | 4.33 × 10$^5$ | 0.60 |
| 110 | 2.91 × 10$^5$ | 0.55 |
| 120 | 1.96 × 10$^5$ | 0.50 |
| 130 | 1.37 × 10$^5$ | 0.46 |
| 140 | 9.44 × 10$^4$ | 0.41 |
| 150 | 6.05 × 10$^4$ | 0.36 |
| 160 | 3.69 × 10$^4$ | 0.32 |
| 170 | 2.25 × 10$^4$ | 0.26 |
| 180 | 1.77 × 10$^4$ | 0.24 |

The data in Table 15 demonstrate that a vibration damping composition of the present invention, prepared using a blend of two curable vibration damping compositions, each derived from different polydimethylsiloxane diamines having molecular weights of 5,280 and 22,300 respectively, provides a useful temperature range of 36 to 106° C.

Example 35

In Example 35, Polydimethylsiloxane Diamine D, Lot 3, molecular weight 34,800, was fed into the first zone of an 18 mm co-rotating twin screw extruder having a 40:1 length:diameter ratio (available from Leistritz Corporation, Allendale N.J.) at a rate of 6.23 g/min (0.000358 equivalents amine/min). MQ silicate resin #1170-002 was fed into zone 2 at a rate of 7.67 g/min. A mixture of 27.46 parts by weight methylenedicyclohexylene-4,4'-diisocyanate, 16.25 parts by weight isocyanato ethyl methacrylate, and 56.29 parts DAROCUR™ 1173 was fed into the fifth zone at a rate 0.105 g/min (0.000330 equivalents isocyanate/min). The feed line of this stream was placed close to the screw threads. The extruder had double-start fully intermeshing screws throughout the entire length of the barrel, rotating at 300 revolutions per minute. The temperature profile for each of the 90 mm long zones was: zones 1 and 2—30° C.; zone 3—35° C.; zone 4—50° C.; zone 5—60° C.; zone 6—75° C.; zone 7—90° C.; zone 8—110° C.; and endcap—120° C. The extrudate was cooled in air and collected.

To a Brabender mixer fit with a 50 gram mixing head at a temperature of 150° C. and agitators rotating at a speed of 50 rpm, was added 40 grams of the curable vibration damping composition prepared above. After mixing for 1 minute, 40 grams alumina, type WA, size 180 (supplied by Micro Abrasives Corporation, Westfield, Mass.) was added, and mixed for 10 minutes. The sample was collected, cooled to room temperature, and pressed between glass plates as in Example 1. The sample was radiation cured through the glass plates by placing the sample between two banks of Sylvania F15/T8/BLB low intensity ultraviolet lamps, at an intensity of 1.0 mW/cm$^2$ for 3 hours, to provide a cured vibration damping compositions. The storage modulus and loss factor were determined for this material and are set forth in Table 16.

TABLE 16

| Temp | Example 35 | |
|---|---|---|
| (° C.) | G' (Pa) | Tan δ |
| −90 | 9.33 × 10$^7$ | 0.02 |
| −80 | 8.63 × 10$^7$ | 0.02 |
| −70 | 7.74 × 10$^7$ | 0.03 |
| −60 | 6.87 × 10$^7$ | 0.05 |
| −50 | 5.91 × 10$^7$ | 0.06 |
| −40 | 4.97 × 10$^7$ | 0.08 |
| −30 | 3.96 × 10$^7$ | 0.10 |
| −20 | 2.54 × 10$^7$ | 0.13 |
| −10 | 1.99 × 10$^7$ | 0.15 |
| 0 | 1.12 × 10$^7$ | 0.19 |
| 10 | 5.43 × 10$^6$ | 0.27 |
| 20 | 3.45 × 10$^6$ | 0.42 |
| 30 | 2.31 × 10$^6$ | 0.67 |
| 40 | 1.69 × 10$^6$ | 0.85 |
| 50 | 1.04 × 10$^6$ | 0.98 |
| 60 | 6.83 × 10$^5$ | 1.06 |
| 70 | 4.33 × 10$^5$ | 1.15 |
| 80 | 2.80 × 10$^5$ | 1.27 |
| 90 | 2.06 × 10$^5$ | 1.44 |
| 100 | 1.46 × 10$^5$ | 1.69 |

TABLE 16-continued

| Temp | Example 35 | |
|---|---|---|
| (° C.) | G' (Pa) | Tan δ |
| 110 | $1.07 \times 10^5$ | 1.99 |
| 120 | $8.45 \times 10^4$ | 1.94 |
| 130 | $6.34 \times 10^4$ | 1.38 |
| 140 | $4.35 \times 10^4$ | 0.90 |
| 150 | $3.19 \times 10^4$ | 1.10 |

The data in Table 16 demonstrate that a cured vibration damping composition containing 50 percent alumina filler provides a useful temperature range of from 17 to 76° C.

Example 36

In Example 36, a vibration damping material was prepared by mixing 59.4 g Polydimethyldiphenylsiloxane Oligourea Segmented Copolymer B, 131.1 g SR-545 MQ resin solution at 68 percent solids, and 1.9 g DAROCUR™ 1173 photoinitiator under slow agitation until homogeneous. The solution was poured into an aluminum tray lined with fluorosilicone coated 50 μm thick polyester release liner. The material was dried by exposure to ambient conditions for 72 hours. Then, the tray was placed in a vacuum oven at ambient temperature and a pressure of 100 Pa for 16 hours. The tray was removed from the oven and the sample was inverted and placed again in the vacuum oven under the same conditions for 8 hours. The material was pressed between 5 mm thick glass plates lined with the above-described release liner to obtain a section having a thickness of about 6.4 mm. The section was radiation cured, through the glass plates, by placing the composite between two banks of Sylvania F15/T8/BLB low intensity ultraviolet lamps, at an intensity of 1.0 mW/cm² for 3.5 hours.

To construct a bi-directional vibration damper from this cured composition, the release liners were removed and the slab was abraded with a SCOTCHBRITE™ #7447 Hand Pad, available from 3M Company, Maplewood, Minn., to roughen the surface of the slab. A bi-directional vibration damping device, similar in appearance to FIG. 1, was constructed by cutting two square sections measuring 38 mm per side and having a thickness of 6.4 mm from the slab, bonding the broad faces of the square sections of vibration damping material 1, using a structural epoxy adhesive, to 4.7 mm thick cold rolled steel plate 2 and members 3a and 3b of FIG. 1, that had been cleaned prior to assembly by sand blasting and solvent degreasing. The epoxy bonded bi-directional vibration damping assembly was fixtured for 24 hours at room temperature to maintain parallelism between the steel members and the viscoelastic pieces during epoxy cure.

The damper assembly was rigidly mounted in an MTS model number 312.21 hydraulically actuated closed loop feedback control testing machine (Minneapolis, Minn.) fit with a temperature controlled chamber. Three cycles of dynamic mechanical testing were then performed at temperatures of 0° C., 15° C., 21° C., and 36° C. at strains of 50% and 100% at each temperature. The storage modulus, G', and loss factor, tan δ, measured at 1 Hz were determined and are reported in Table 17.

TABLE 17

| | Example 19 | | |
|---|---|---|---|
| Temp (° C.) | Strain (%) | G' | Tan δ |
| 0 | 50 | $1.03 \times 10^6$ | 1.88 |
| 15 | 50 | $6.55 \times 10^5$ | 1.88 |
| 21 | 50 | $5.53 \times 10^5$ | 1.82 |
| 36 | 50 | $3.32 \times 10^5$ | 1.67 |
| 0 | 100 | $5.04 \times 10^5$ | 2.05 |
| 15 | 100 | $3.80 \times 10^5$ | 1.94 |
| 21 | 100 | $3.37 \times 10^5$ | 1.85 |
| 36 | 100 | $2.22 \times 10^5$ | 1.67 |

The results in Table 17 demonstrate that the storage modulus, G', and the loss factor, tan δ, of this curable vibration damping composition are high and relatively insensitive to changes in temperature. These are particularly desirable features of viscoelastic materials employed in bi-directional damping constructions.

Example 37

In Example 37, 0.30 grams 1,12-diaminedodecane (Available from Aldrich), and 100.0 grams Polydimethylsiloxane Diamine D, Lot 2, molecular weight 37,800, was dissolved in 100 grams of a 50/50 toluene/isopropanol mixture. To the solution was added dropwise a mixture of 0.46 grams isocyanatoethylmethacrylate and 0.72 grams tetramethyl-m-xylylene diisocyanate in 20 grams of a 50/50 toluene/isopropanol mixture. To the solution was added 1.0 gram Darocur™ 1173, and the resulting mixture was dried in air to form a white, viscous fluid.

Twenty grams of the polymer was dissolved in 25 grams of a 50/50 toluene/isopropanol mixture. To the solution was added 30 grams dried MQ resin, and the solution was agitated slowly until homogeneous. The somewhat hazy solution was dried in air on a release liner to form a tacky, compliant material. One part of the dried polymer was coated at 130° C. between 38 μm primed polyester and a release liner to a thickness of 38 μm, exposed to UV light to cure, and tested for PSA properties and the peel force from glass was 85.4 N/dm.

Another part of the dried polymer containing MQ resin was subsequently pressed between two release liners to a thickness of approximately 1 mm and cured by exposure to low intensity UV lights for 20 minutes. Dynamic mechanical properties of the material were tested as in Example 5 and are reported in Table 18.

Example 38

In Example 38, 1.9 grams 1,12-diaminedodecane, and 100.0 grams Polydimethylsiloxane Diamine A, molecular weight 5,280, were dissolved in 100 grams of a 50/50 toluene/isopropanol mixture. To the solution was added dropwise a mixture of 2.94 grams isocyanatoethylmethacrylate and 4.62 grams tetramethyl-m-xylylene diisocyanate in 20 grams of a 50/50 toluene/isopropanol mixture. To the solution was added 1.0 gram Darocur™ 1173, and the resulting mixture was dried in air to form a hazy, semisolid.

Twenty grams of the dried polymer was dissolved in 25 grams of a 50/50 toluene/isopropanol mixture. To the solution was added 30 grams dried MQ resin, and the solution was agitated slowly until homogeneous. The solution was dried in air on a release liner to form a stiff, somewhat tacky, material.

One part of the dried polymer containing MQ resin was used to prepare a hot melt adhesive bond according to the procedure described previously and tested for adhesive bond strength.

|  | Glass | PMMA |
|---|---|---|
| Stress at break MN/m$^2$ | >1.2 (glass shattered) | 1.26 |
| Strain at break % | n/a | 458 |

Another part of the dried polymer containing MQ resin was subsequently pressed between two release liners to a thickness of approximately 1 mm and cured by exposure to low intensity UV lights for 20 minutes. Dynamic mechanical properties of the material were tested as in Example 5 and are reported in Table 18.

Example 39

In Example 39, 0.96 grams Polamine™ 1H1000 (available from Air Products and Chemicals, Inc. Allentown, Pa.), and 100.0 grams Polydimethylsiloxane Diamine D, Lot 2, molecular weight 37,800, was dissolved in 100 grams of a 50/50 toluene/isopropanol mixture. To the solution was added dropwise a mixture of 0.46 grams isocyanatoethylmethacrylate and 0.72 grams tetramethyl-m-xylylene diisocyanate in 20 grams of a 50/50 toluene/isopropanol mixture. To the solution was added 1.0 gram Darocur™ 1173, and the resulting mixture was dried in air to form white, very viscous fluid. Twenty grams of the dried polymer was dissolved in 25 grams of a 50/50 toluene/isopropanol mixture. To the solution was added 30 grams dried MQ resin, and the solution was agitated slowly until homogeneous.

One part of the somewhat hazy solution was dried in air on a release liner to form a tacky, compliant material that was coated at 130° C. between 38 μm primed polyester and a release liner to provide a PSA layer having a thickness of 25 μm, cured by exposure to UV, and tested for PSA properties and the peel force from glass was 37.2 N/dm Another part of the dried polymer containing MQ resin was subsequently pressed between two release liners to a thickness of approximately 1 mm and cured by exposure to low intensity UV lights for 20 minutes. Dynamic mechanical properties of the material were tested as in Example 5 and are reported in Table 18.

Example 40

In Example 40, 5.24 grams tetramethyl-m-xylylene diisocyanate was charged to a 500 mL flask in 10 milliliters of dichloromethane. To this was added 31.7 grams of Jeffamine D-2000 (available form Huntsman Corp.), and the sample was well mixed. Next was added a solution of 61.4 grams of Polydimethylsiloxane Diamine A, molecular weight 5,280, in 40 mL dichloromethane. Next, 1.66 grams isocyanatoethylmethacrylate was added and the solution was mixed for 15 minutes, followed by the addition of 1.1 grams Darocur™ 1173. The mixture was allowed to dry on a release liner in the dark to form a bluish, somewhat inhomogeneous semisolid.

Twenty grams of the dried polymer was dissolved in 25 grams of a 50/50 toluene/isopropanol mixture. To the solution was added 30 grams dried MQ resin, and the solution was agitated slowly until homogeneous. The solution was dried in air on a release liner to form a stiff, somewhat tacky, material.

One part of the dried polymer containing MQ resin was used to prepare a hot melt adhesive bond according to the procedure described previously and tested for adhesive bond strength.

|  | Glass | PMMA |
|---|---|---|
| Stress at break MN/m$^2$ | >2.0 | 0.4 |
| Strain at break % | 2330 | 331 |

Another part of the dried polymer was subsequently pressed between two release liners to a thickness of approximately 1 mm and cured by exposure to low intensity UV lights for 20 minutes. Dynamic mechanical properties of the material were tested as in Example 5 and are reported in Table 18.

TABLE 18

| Temp | Example 37 | | Example 38 | | Example 39 | | Example 40 | |
|---|---|---|---|---|---|---|---|---|
| (° C.) | G' (Pa) | Tan δ | G' (Pa) | Tan δ | G' (Pa) | Tan δ | G' (Pa) | Tan δ |
| −90 | 7.27 × 10$^7$ | 0.03 | 5.80 × 10$^7$ | 0.03 | 7.55 × 10$^7$ | 0.03 | 6.65 × 10$^7$ | 0.02 |
| −80 | 6.71 × 10$^7$ | 0.03 | 5.36 × 10$^7$ | 0.03 | 7.14 × 10$^7$ | 0.03 | 6.33 × 10$^7$ | 0.02 |
| −70 | 5.93 × 10$^7$ | 0.06 | 4.80 × 10$^7$ | 0.05 | 6.48 × 10$^7$ | 0.04 | 5.97 × 10$^7$ | 0.02 |
| −60 | 5.31 × 10$^7$ | 0.09 | 4.55 × 10$^7$ | 0.06 | 5.91 × 10$^7$ | 0.05 | 5.69 × 10$^7$ | 0.04 |
| −50 | 4.72 × 10$^7$ | 0.11 | 4.58 × 10$^7$ | 0.07 | 5.24 × 10$^7$ | 0.07 | 5.03 × 10$^7$ | 0.06 |
| −40 | 4.05 × 10$^7$ | 0.13 | 4.36 × 10$^7$ | 0.08 | 4.75 × 10$^7$ | 0.08 | 3.94 × 10$^7$ | 0.10 |
| −30 | 3.40 × 10$^7$ | 0.17 | 4.02 × 10$^7$ | 0.09 | 4.20 × 10$^7$ | 0.11 | 3.09 × 10$^7$ | 0.12 |
| −20 | 2.75 × 10$^7$ | 0.22 | 3.66 × 10$^7$ | 0.10 | 3.31 × 10$^7$ | 0.16 | 2.39 × 10$^7$ | 0.16 |
| −10 | 2.28 × 10$^7$ | 0.27 | 3.27 × 10$^7$ | 0.11 | 2.38 × 10$^7$ | 0.25 | 1.85 × 10$^7$ | 0.19 |
| 0 | 1.63 × 10$^7$ | 0.36 | 2.92 × 10$^7$ | 0.13 | 1.61 × 10$^7$ | 0.35 | 1.35 × 10$^7$ | 0.23 |
| 10 | 1.07 × 10$^7$ | 0.49 | 2.57 × 10$^7$ | 0.15 | 9.11 × 10$^6$ | 0.53 | 9.72 × 10$^6$ | 0.26 |
| 20 | 5.35 × 10$^6$ | 0.77 | 2.16 × 10$^7$ | 0.18 | 4.35 × 10$^6$ | 0.75 | 7.50 × 10$^6$ | 0.26 |
| 30 | 2.79 × 10$^6$ | 0.92 | 1.72 × 10$^7$ | 0.22 | 2.46 × 10$^6$ | 0.89 | 6.16 × 10$^6$ | 0.25 |
| 40 | 1.68 × 10$^6$ | 1.08 | 1.27 × 10$^7$ | 0.27 | 1.36 × 10$^6$ | 1.01 | 4.98 × 10$^6$ | 0.25 |

TABLE 18-continued

| Temp | Example 37 | | Example 38 | | Example 39 | | Example 40 | |
|---|---|---|---|---|---|---|---|---|
| (° C.) | G' (Pa) | Tan δ | G' (Pa) | Tan δ | G' (Pa) | Tan δ | G' (Pa) | Tan δ |
| 50 | $9.14 \times 10^5$ | 1.22 | $8.79 \times 10^6$ | 0.33 | $5.09 \times 10^5$ | 1.12 | $3.56 \times 10^6$ | 0.25 |
| 60 | $4.52 \times 10^5$ | 1.32 | $5.60 \times 10^6$ | 0.41 | $1.67 \times 10^5$ | 1.12 | $2.72 \times 10^6$ | 0.28 |
| 70 | $1.56 \times 10^5$ | 1.38 | $2.99 \times 10^6$ | 0.49 | $9.03 \times 10^4$ | 1.02 | $1.96 \times 10^6$ | 0.37 |
| 80 | $1.01 \times 10^5$ | 1.31 | $1.73 \times 10^6$ | 0.55 | $4.68 \times 10^4$ | 0.91 | $1.20 \times 10^6$ | 0.53 |
| 90 | $6.03 \times 10^4$ | 1.21 | $1.13 \times 10^6$ | 0.58 | $3.31 \times 10^4$ | 0.83 | $6.73 \times 10^5$ | 0.68 |
| 100 | $3.65 \times 10^4$ | 1.11 | $7.53 \times 10^5$ | 0.60 | $2.33 \times 10^4$ | 0.76 | $3.63 \times 10^5$ | 0.75 |
| 110 | $2.69 \times 10^4$ | 1.04 | $5.21 \times 10^5$ | 0.58 | $1.77 \times 10^4$ | 0.66 | $1.34 \times 10^5$ | 0.68 |
| 120 | $2.01 \times 10^4$ | 0.97 | $3.54 \times 10^5$ | 0.54 | $1.46 \times 10^4$ | 0.56 | $5.80 \times 10^4$ | 0.62 |
| 130 | $1.60 \times 10^4$ | 0.85 | $2.38 \times 10^5$ | 0.45 | $1.13 \times 10^4$ | 0.43 | $5.26 \times 10^4$ | 0.57 |
| 140 | $1.41 \times 10^4$ | 0.75 | $1.78 \times 10^5$ | 0.40 | $8.37 \times 10^3$ | 0.39 | $4.59 \times 10^4$ | 0.54 |
| 150 | $1.21 \times 10^4$ | 0.65 | $1.18 \times 10^5$ | 0.31 | $5.61 \times 10^3$ | 0.27 | $4.00 \times 10^4$ | 0.50 |
| 160 | $1.07 \times 10^4$ | 0.60 | $5.60 \times 10^4$ | 0.24 | $5.73 \times 10^3$ | 0.27 | $3.38 \times 10^4$ | 0.48 |
| 170 | $9.15 \times 10^3$ | 0.54 | $4.30 \times 10^4$ | 0.19 | $5.33 \times 10^3$ | 0.28 | $2.71 \times 10^4$ | 0.44 |
| 180 | $8.07 \times 10^3$ | 0.50 | $3.03 \times 10^4$ | 0.16 | $4.38 \times 10^3$ | 0.25 | $2.18 \times 10^4$ | 0.41 |
| 190 | $5.77 \times 10^3$ | 0.51 | — | — | $1.54 \times 10^3$ | 0.4 | $1.25 \times 10^4$ | 0.36 |

The data in Table 18 for Examples 37 and 38 show that polydimethylsiloxane oligourea segmented copolymeric vibration damping compositions derived from a polydimethylsiloxane diamine of about 38,000 or 5,000 molecular weight and a hydrocarbon polyamine, 1,12-diamine dodecane, provide damping materials having useful temperature ranges of 17 to 61° C. and 58 to 116° C. respectively.

The data in Table 18 for Examples 39 and 40 show that the damping composition of Example 39, containing a mixture of a polydimethylsiloxane diamine of about 38,000 molecular weight and Polamine™ 1H1000, a polytetramethyleneoxide diamine of about 1,000 MW, provided a useful temperature range of 14 to 51° C., and that the damping composition of Example 40, containing a mixture of a polydimethylsiloxane diamine of about 5,000 molecular weight and Jeffamine D-2000, a polypropyleneoxide diamine of about 2,000 MW, provided a useful temperature range of 75 to 96° C.

Example 41

In Example 41 Polydimethylsiloxane Diamine A, Lot 1, molecular weight 5,280 was fed into the first zone of an 18 mm co-rotating twin screw extruder having a 40:1 length-:diameter ratio (available from Leistritz Corporation, Allendale, N.J.) at a rate of 6.22 g/min (0.00236 equivalents amine/min). MQ silicate resin, containing 1% toluene, obtained from General Electric Silicone Products Division, Waterford, N.Y. as experimental material #1170-002 was fed into zone 2 at a rate of 7.6 g/min. A mixture of 50.8 parts by weight tetramethyl-m-xylylene diisocyanate, 32.3 parts by weight isocyanatoethyl methacrylate, and 33.9 parts by weight DAROCUR™ 1173 was fed into the sixth zone at a rate of 0.378 g/min (0.00236 equivalents isocyanate/min). The feed line of this stream was placed close to the screw threads. The extruder had double-start fully intermeshing screws throughout the entire length of the barrel, rotating at 200 revolutions per minute. The temperature profile for each of the 90 mm long zones was: zones 1 through 4—20 to 30° C.; zone 5—40° C.; zone 6—60° C.; zone 7—90° C.; zone 8—100° C.; and endcap—120° C. The extrudate was cooled in air, and collected.

A portion of the composition was heated to 200° C. in a metal can and applied to various components of a printed circuit board for the purpose of rigidizing and potting components on the board. The printed circuit board assembly was put into a freezer at −20 to −15° C. for 12 hours with no adhesive failure (debonding) or solder cracking noted. Another portion of this composition was tested as a curable hot-melt adhesive according to the procedure described previously. Test results are given below

| | Glass | PMMA |
|---|---|---|
| Stress at break MN/m² | >2.4 (glass shattered) | 0.7 |
| Strain at break % | n/a | 378 |

Example 42

In Example 42, 38.0 parts Polydimethylsiloxane Diamine A, Lot 1, molecular weight 5,280, and 30.0 parts toluene were added to a round bottom flask fit with mechanical stirrer. To this stirred solution was added dropwise a mixture of 1.26 parts methylenecyclohexylene-4,4'-diisocyanate, 0.74 parts isocyanatoethylmethacrylate, and 10 parts toluene. The copolymer thus formed was employed to prepare a thermally curable polydimethylsiloxane oligourea segmented copolymeric adhesive by blending 30 parts of the copolymer solution with 36.4 parts MQ resin solution SR545 at 62.2% solids and 0.38 parts benzoyl peroxide, and agitating until homogeneous. The solution was poured out onto a release liner and allowed to air dry at ambient temperature. After drying, the sample was pressed between release liners to obtain a 30 mil thick layer that was employed to construct an overlap shear sample to assess adhesive bond strength. The overlap shear sample was prepared as previously described with the exception that steel adherents were employed and that after assembly at room temperature the sample was placed in a forced air oven at 85° C. for 5 minutes to allow the sample to flow out, followed by 10 minutes at 170° C. to cure the sample. The cured adhesive bond was tested as in Example 41 and found to provide a maximum stress at break of 1.03 MN/M² at a strain of 560%.

The various modifications and alterations of this invention will be apparent to those skilled in the art without departing from the scope and spirit of this invention and this invention should not be restricted to that set forth herein for illustrative purposes.

What is claimed is:

1. A curable tackified polydiorganosiloxane oligourea segmented copolymer having a degree of oligomerization of 3 to 16 comprising (a) an oligourea segmented copolymer having (i) soft polydiorganosiloxane diamine residue units, wherein the polydiorganosiloxane diamine residue is the polydiorganosiloxane diamine minus the —NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, (iii) monoisocyanate residue terminal units having a free radically curable or a moisture curable endcapping group, wherein the monoisocyanate residue terminal units are the monoisocyanate minus the —NCO group, and (iv) urea linkages connecting the isocyanate residue units, the polydiorganosiloxane diamine residue units and the monoisocyanate residue terminal units, and (b) a silicate resin.

2. The curable tackified polydiorganosiloxane oligourea segmented copolymers according to claim 1 represented by the formula:

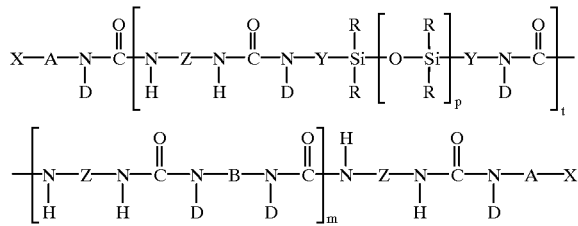

wherein:
each R is a monovalent moiety which independently is a substituted or unsubstituted alkyl moiety, (ii) a substituted or unsubstituted vinyl radical or higher alkenyl radical, (iii) a substituted or unsubstituted cycloalkyl moiety having about 6 to 12 carbon atoms, (iv) a substituted or unsubstituted aryl moiety, (v) a perfluoroalkyl group, (vi) a fluorine-containing group, or (vii) a perfluoroether-containing group;

each Z is a polyvalent radical which is (i) an arylene radical or aralkylene radical having from about 6 to 20 carbon atoms, or (ii) an alkylene or cycloalkylene radical having from about 6 to 20 carbon atoms;

each Y is a divalent moiety which independently is (i) an alkylene radical having 1 to 10 carbon atoms, or (ii) an aralkylene radical or an arylene radical having 6 to 20 carbon atoms;

each A is independently —B—, or —YSi(R)$_2$(OSi(R)$_2$)$_p$Y— or mixtures thereof; B is a polyvalent radical selected from the group consisting of alkylene, aralkylene, cycloalkylene, phenylene, polyalkylene oxide and copolymers thereof, and mixtures thereof;

each D is a monovalent radical which independently is hydrogen, an alkyl radical having 1 to 10 carbon atoms, or an aryl or arylalkyl radical having about 6 to 20 carbon atoms;

each X is a moiety represented by the formula:

(a) a moiety represented by

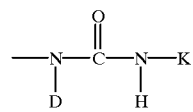

(IV)

wherein D is defined as above, and
K is independently (i) a free radical polymerizable end group; or (ii) a moisture curable group;
m is a number about 0 to 8;
p is about 10 or larger; and
t is about 1 to 12.

3. The polydiorganosiloxane oligourea segmented copolymer according to claim 2 wherein at least 50% of the R moieties are methyl radicals with the balance being monovalent alkyl or substituted alkyl radicals, alkenylene radicals, phenyl radicals, or substituted phenyl radicals.

4. The polydiorganosiloxane oligourea segmented copolymer of claim 2 wherein Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, or 1,4-cyclohexylene.

5. The polydiorganosiloxane oligourea segmented copolymer of claim 4 wherein Z tetramethyl-m-xylylene.

6. The polydiorganosiloxane oligourea segmented copolymer according to claim 1 wherein the silicate resin is an MQ silicate resin, an MQD silicate resin or an MQT silicate resin.

7. A pressure sensitive adhesive article comprising (a) a substrate, and (b) a pressure sensitive adhesive comprising a curable tackified polydiorganosiloxane oligourea segmented copolymer having a degree of oligomerization of 3 to 16 comprising (i) an oligourea segmented copolymer having (A) soft polydiorganosiloxane diamine residue units, wherein the polydiorganosiloxane diamine residue is the polydiorganosiloxane diamine minus the —NDH group with D selected from hydrogen, alkyl radicals having 1 to 10 carbon atoms, phenyl or a radical that completes a ring structure to form a heterocycle having about 6 to 20 carbon atoms, (B) hard polyisocyanate residue units, wherein the polyisocyanate residue is the polyisocyanate minus the —NCO groups, (C) monoisocyanate residue terminal units having a free radically curable or a moisture curable endcapping group, wherein the monoisocyanate residue terminal units are the monoisocyanate minus the —NCO group, and (D) urea linkages connecting the isocyanate residue units, the polydiorganosiloxane diamine residue units and the monoisocyanate residue terminal units, and (ii) a silicate resin.

8. The pressure sensitive adhesive article according to claim 7, wherein the substrate is paper, polyolefin, polyethylene terephthalate, polycarbonate, polyvinyl chloride, polytetrafluoroethylene, polyimide, cellulose acetate, ethyl cellulose, woven fabric formed of threads of synthetic or natural materials, nonwoven fabric, metal, metallized polymeric film, acrylic, silicone, urethane, polyethylene, polypropylene, neoprene rubber, filled and unfilled foamed materials, or ceramic sheet material.

9. The pressure sensitive adhesive article according to claim 7, wherein the pressure sensitive adhesive is cured.

10. A hot melt adhesive comprising a curable tackified polydiorganosiloxane oligourea segmented copolymer having a degree of oligomerization of 3 to 16 comprising (a) an oligurea segmented copolymer having (i) soft polydiorganosiloxane diamine residue units, wherein the polydiorganosiloxane diamine residue is the polydiorganosiloxane diamine minus the —NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, (iii) monoisocyanate residue terminal units having a free radically curable or a moisture curable endcapping group, wherein the monoisocyanate residue terminal units are the monoisocyanate minus the —NCO group, and (iv) urea linkages connecting the isocyanate residue units, the polydiorganosiloxane diamine residue units and the monoisocyanate residue terminal units, and (b) a silicate resin.

11. The hot melt adhesive according to claim 10, wherein the polydiorganosiloxane oligourea segmented copolymer is cured.

12. A bi-directional vibration damping constrained layer construction comprising at least two rigid members, each rigid member having a broad surface proximate a broad surface of another rigid member and closely spaced therefrom, and a composition comprising the curable tackified polydiorganosiloxane oligourea segmented copolymer according to claim 2, wherein the composition is contained between closely spaced, rigid members, adhered to the members, and cured.

13. A process for producing the curable tackified polydiorganosiloxane oligourea segmented copolymer of claim 1 comprising (a) forming a polydiorganosiloxane oligourea segmented copolymer by adding at least one polyisocyanate and at least one monoisocyanate terminal unit having a free radically curable or a moisture curable endcapping group to an organic solvent solution of at least one polyamine, wherein the polyamine is at least one polydiorganosiloxane diamine or a mixture of at least one diorganosiloxane diamine and at least one organic polyamine, mixing the solution and allowing the polyisocyanate, monoisocyanate, and polyamine to react to form a polydiorganosiloxane oligourea segmented copolymer, (b) blending the polydiorganosiloxane oligourea segmented copolymer solution with at least one silicate resin, and (c) removing the organic solvent.

14. A process for producing a curable tackified polydiorganosiloxane oligourea segmented copolymer having a degree of oligomerization of 3 to 16 and comprising (A) an oligourea segmented copolymer having (i) soft polydiorganosiloxane diamine residue units, wherein the polydiorganosiloxane diamine residue is the polydiorganosiloxane diamine minus the —NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, and the residues of the isocyanate units and the polydiorganosiloxane diamine units are connected by urea linkages, and (iii) terminal functional endcapping groups, and (B) a silicate resin; wherein the process comprises the steps of (a) continuously providing reactants, wherein the reactants comprise at least one polyisocyanate, at least one polyamine, and at least one endcapping agent to a reactor; (b) mixing the reactants in the reactor; (c) allowing the reactants to react under substantially solvent free conditions to form a polydiorganosiloxane oligourea segmented copolymer; (d) conveying the copolymer from the reactor; (e) providing the copolymer, at least one silicate tackifying resin, and solvent to a second reactor; (f) mixing the copolymer, the silicate tackifying resin, and the solvent in the second reactor to form a tackified composition; and (g) conveying the tackified composition from the second reactor.

15. An essentially solventless process for producing the curable tackified polydiorganosiloxane oligourea segmented copolymer having a degree of oligomerization of 3 to 16 and comprising (A) an oligourea segmented copolymer having (i) soft polydiorganosiloxane diamine residue units, wherein the polydiorganosiloxane diamine residue is the polydiorganosiloxane diamine minus the —NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, and the residues of the isocyanate units and the polydiorganosiloxane diamine units are connected by urea linkages, and (iii) terminal functional endcapping groups, and (B) a silicate resin; wherein the process comprises the steps of (a) forming polydiorganosiloxane oligourea segmented copolymer by continuously providing reactants, wherein the reactants comprise at least one polyisocyanate, at least one endcapping agent that has end groups that are reactive under free radical or moisture cure conditions, and at least one polyamine to a reactor, (b) mixing the reactants in the reactor, (c) allowing the reactants to react to form a polydiorganosiloxane oligourea copolymer, (d) conveying polymer from the reactor, and (e) incorporating a silicate resin by blending the silicate resin with reactants or the polydiorganosiloxane oligourea segmented copolymer.

16. The polydiorganosiloxane diamine oligourea segmented copolymer, according to claim 1, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

17. The polydiorganosiloxane diamine oligourea segmented copolymer, according to claim 2, wherein R is a moiety independently selected from (i) a substituted or unsubstituted alkyl moiety having 1 to 12 carbon atoms, (ii) a radical represented by the formula —$R^2(CH_2)_a CH = CH_2$; wherein $R^2$ is —$(CH_2)_b$— or —$(CH_2)_c CH = CH$—; a is 1, 2 or 3; b is 0, 3 or 6; and c is 3, 4 or 5, (iii) a cycloalkyl moiety having 6 to 12 carbon atoms and substituted with an alkyl, fluoroalkyl or vinyl group, or (iv) a substituted or unsubstituted aryl moiety having 6 to 20 carbon atoms.

18. The pressure sensitive adhesive article, according to claim 7, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

19. The hot melt adhesive, according to claim 10, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

20. The curable tackified polydiorganosiloxane oligourea segmented copolymer of claim 1 wherein the endcapping groups on the monoisocyanate residue terminal units are free radically curable endcapping groups.

21. The curable tackified polydiorganosiloxane oligourea segmented copolymer of claim 1 wherein the endcapping groups on the monoisocyanate residue terminal units are moisture curable endcapping groups.

22. The curable tackified polydiorganosiloxane oligourea segmented copolymer of claim 2 wherein K is a free radical polymerizable end group.

23. The curable tackified polydiorganosiloxane oligourea segmented copolymer of claim 2 wherein K is a moisture curable group.

24. The pressure sensitive adhesive article of claim 7 wherein the endcapping groups on the monoisocyanate residue terminal units are free radically curable endcapping groups.

25. The pressure sensitive adhesive article of claim 7 wherein the endcapping groups on the monoisocyanate residue terminal units are moisture curable endcapping groups.

26. The process of claim 13 wherein the endcapping groups on the monoisocyanate residue terminal units are free radically curable endcapping groups.

27. The process of claim 13 wherein the endcapping groups on the monoisocyanate residue terminal units are moisture curable endcapping groups.

28. A curable tackified polydiorganosiloxane oligourea segmented copolymer having a degree of oligomerization of 3 to 16 comprising (a) an oligourea segmented copolymer having (i) soft polydiorganosiloxane diamine residue units, wherein the polydiorganosiloxane diamine residue is the polydiorganosiloxane diamine minus the—NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, (iii) monoamine residue terminal units having a free radically curable or a moisture curable endcapping group, wherein the monoamine residue terminal units are the monoamine minus the —NDH group with D selected from hydrogen, alkyl radicals having 1 to 10 carbon atoms, phenyl and a radical that completes a ring structure to form a heterocycle having about 6 to 20 carbon atoms, and (iv) urea linkages connecting the isocyanate residue units, the polydiorganosiloxane diamine residue units and monoamine residue terminal units, and (b) a silicate resin.

29. The curable tackified polydiorganosiloxane oligourea segmented copolymer according to claim 28 wherein the monoamine residue terminal units have a free radically curable endcapping group.

30. The curable tackified polydiorganosiloxane oligourea segmented copolymer according to claim 28 wherein the monoamine residue terminal units have a moisture curable endcapping group.

31. The curable tackified polydiorganosiloxane oligourea segmented copolymer according to claim 28 represented by the formula:

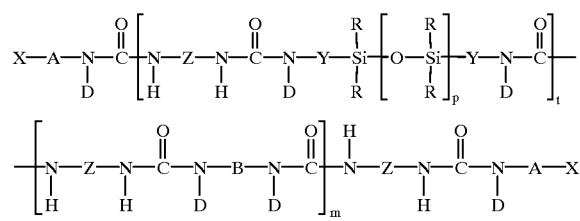

wherein:

each R is a monovalent moiety which independently is a substituted or unsubstituted alkyl moiety, (ii) a substituted or unsubstituted vinyl radical or higher alkenyl radical, (iii) a substituted or unsubstituted cycloalkyl moiety having about 6 to 12 carbon atoms, (iv) a substituted or unsubstituted aryl moiety, (v) a perfluoroalkyl group, (vi) a fluorine-containing group, or (vii) a perfluoroether-containing group;

each Z is a polyvalent radical which is (i) an arylene radical or aralkylene radical having from about 6 to 20 carbon atoms, or (ii) an alkylene or cycloalkylene radical having from about 6 to 20 carbon atoms;

each Y is a divalent moiety which independently is (i) an alkylene radical having 1 to 10 carbon atoms, or (ii) an aralkylene radical or an arylene radical having 6 to 20 carbon atoms;

each A is independently —B—, or —YSi(R)$_2$(OSi(R)$_2$)$_p$Y— or mixtures thereof;

B is a polyvalent radical selected from the group consisting of alkylene, aralkylene, cycloalkylene, phenylene, polyalkylene oxide and copolymers thereof, and mixtures thereof;

each D is a monovalent radical which independently is hydrogen, an alkyl radical having 1 to 10 carbon atoms, or an aryl or arylalkyl radical having about 6 to 20 carbon atoms; each X is a moiety represented by the formula:
(a) a moiety represented by

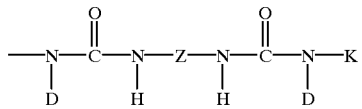

where each of Z and D are defined as above, and
K is independently (i) a free radical polymerizable end group; or (ii) a moisture curable group,
m is a number about 0 to 8;
p is about 10 or larger; and
t is about 1 to 12.

32. The curable tackified polydiorganosiloxane oligourea segmented copolymer according to claim 31 wherein K is a free radical polymerizable end group.

33. The curable tackified polydiorganosiloxane oligourea segmented copolymer according to claim 31 wherein K is a moisture curable group.

34. The polydiorganosiloxane oligourea segmented copolymer according to claim 31 wherein at least 50% of the R moieties are methyl radicals with the balance being monovalent alkyl or substituted alkyl radicals, alkenylene radicals, phenyl radicals, or substituted phenyl radicals.

35. The polydiorganosiloxane oligourea segmented copolymer of claim 31 wherein Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, or 1,4-cyclohexylene.

36. The polydiorganosiloxane oligourea segmented copolymer of claim 35 wherein Z tetramethyl-m-xylylene.

37. The polydiorganosiloxane oligourea segmented copolymer according to claim 28 wherein the silicate resin is an MQ silicate resin, an MQD silicate resin or an MQT silicate resin.

38. A pressure sensitive adhesive article comprising (a) a substrate, and (b) a pressure sensitive adhesive comprising a curable tackified polydiorganosiloxane oligourea segmented copolymer having a degree of oligomerization of 3 to 16 comprising (i) an oligourea segmented copolymer having (A) soft polydiorganosiloxane diamine residue units, wherein the polydiorganosiloxane diamine residue is the polydiorganosiloxane diamine minus the —NDH group with D selected from hydrogen, alkyl radicals having 1 to 10 carbon atoms, phenyl or a radical that completes a ring structure to form a heterocycle having about 6 to 20 carbon atoms, (B) hard polyisocyanate residue units, wherein the polyisocyanate residue is the polyisocyanate minus the —NCO groups, (C) monoamine residue terminal units having a free radically curable or a moisture curable endcapping group, wherein the monoamine residue terminal units are the monoamine minus the —NDH group with D selected from hydrogen, alkyl radicals having 1 to 10 carbon atoms, phenyl and a radical that completes a ring structure to form a heterocycle having about 6 to 20 carbon atoms, and (D) urea linkages connecting the isocyanate residue units, the polydiorganosiloxane diamine residue units and the monoamine residue terminal units, and (ii) a silicate resin.

39. The pressure sensitive adhesive article according to claim 38, wherein the substrate is paper, polyolefin, polyethylene terephthalate, polycarbonate, polyvinyl chloride, polytetrafluoroethylene, polyimide, cellulose acetate, ethyl cellulose, woven fabric formed of threads of synthetic or natural materials, nonwoven fabric, metal, metallized polymeric film, acrylic, silicone, urethane, polyethylene, polypropylene, neoprene rubber, filled and unfilled foamed materials, or ceramic sheet material.

40. The pressure sensitive adhesive article according to claim 38, wherein the pressure sensitive adhesive is cured.

41. A hot melt adhesive comprising a curable tackified polydiorganosiloxane oligourea segmented copolymer having a degree of oligomerization of 3 to 16 comprising (a) an oligourea segmented copolymer having (i) soft polydiorganosiloxane diamine residue units, wherein the polydiorganosiloxane diamine residue is the polydiorganosiloxane diamine minus the —NDH groups with D selected from hydrogen, alkyl radicals having 1 to 10 carbon atoms, phenyl or a radical that completes a ring structure to form a heterocycle having about 6 to 20 carbon atoms, (ii) hard polyisocyanate residue units, wherein the polyisocyanate residue is the polyisocyanate minus the —NCO groups, (iii) monoamine residue terminal units having a free radically curable or a moisture curable endcapping group, wherein the monoamine residue terminal units are the monoamine minus the —NDH group with D selected from hydrogen, alkyl radicals having 1 to 10 carbon atoms, phenyl and a radical that completes a ring structure to form a heterocycle having about 6 to 20 carbon atoms, and (iv) urea linkages connecting the isocyanate residue units, the polydiorganosiloxane diamine residue units and the monoamine residue terminal units, and (b) a silicate resin.

42. The hot melt adhesive according to claim 41, wherein the polydiorganosiloxane oligourea segmented copolymer is cured.

43. A bi-directional vibration damping constrained layer construction comprising at least two rigid members, each rigid member having a broad surface proximate a broad surface of another rigid member and closely spaced therefrom, and a composition comprising the curable tackified polydiorganosiloxane oligourea segmented copolymer according to claim 31, wherein the composition is contained between closely spaced, rigid members, adhered to the members, and cured.

44. A process for producing the curable tackified polydiorganosiloxane oligourea segmented copolymer of claim 28 comprising (a) forming a polydiorganosiloxane oligourea segmented copolymer by adding at least one polyisocyanate and at least one monoamine endcapping agent that has end groups that are reactive under free radical or moisture cure conditions to an organic solvent solution of at least one polyamine, wherein the polyamine is at least one polydiorganosiloxane diamine or a mixture of at least one diorganosiloxane diamine and at least one organic polyamine, mixing the solution and allowing the polyisocyanate, monoamine endcapping agent, and polyamine to react to form a polydiorganosiloxane oligourea segmented copolymer, (b) blending the polydiorganosiloxane oligourea segmented copolymer solution with at least one silicate resin, and (c) removing the organic solvent.

45. The polydiorganosiloxane diamine oligourea segmented copolymer, according to claim 28, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

46. The polydiorganosiloxane diamine oligourea segmented copolymer, according to claim 31, wherein R is a moiety independently selected from (i) a substituted or unsubstituted alkyl moiety having 1 to 12 carbon atoms, (ii) radical represented by the formula —R²(CH₂)ₐCH=CH₂; wherein R² is —(CH₂)ᵦ— or —(CH₂)꜀CH=CH—; a is 1, 2 or 3; b is 0, 3 or 6; and c is 3, 4 or 5, (iii) cycloalkyl moiety having 6 to 12 carbon atoms and substituted with an alkyl, fluoroalkyl or vinyl group, or (iv) a substituted or unsubstituted aryl moiety having 6 to 20 carbon atoms.

47. The pressure sensitive adhesive article, according to claim 38, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

48. The hot melt adhesive according to claim 41, wherein the segmented copolymer further includes soft and/or hard organic polyamine residue units, wherein the organic polyamine residue is the organic polyamine minus the —NDH group, connected to the polydiorganosiloxane units by urea linkages; wherein D is selected from hydrogen, alkyl radicals having 1 to 10 carbon atoms, phenyl or a radical that completes a ring structure to form a heterocycle having about 6 to 20 carbon atoms.

49. A curable tackified polydiorganosiloxane oligourea segmented copolymer having a degree of oligomerization of 3 to 16 comprising (a) an oligourea segmented copolymer having (i) at least two soft polydiorganosiloxane diamine residue units, wherein the polydiorganosiloxane diamine residue units are a polydiorganosiloxane diamine minus all —NDH groups with D selected from hydrogen, alkyl radicals having 1 to 10 carbon atoms, phenyl and a radical that completes a ring structure to form a heterocycle having about 6 to 20 carbon atoms, (ii) at least three hard polyisocyanate residue units, wherein the polyisocyanate residue units are a polyisocyanate minus the—NCO groups, (iii) urea linkages connecting alternating isocyanate residue units and polydiorganosiloxane diamine residue units, and (iv) terminal groups having free radically curable end groups, and (b) a silicate resin.

50. The curable tackified polydiorganosiloxane oligourea segmented copolymer according to claim 49 wherein the terminal groups are monoisocyanate residue terminal units each having a free radically curable endcapping group, and urea linkages connect the monoisocyanate residue terminal units to the alternating isocyanate residue units and polydiorganosiloxane diamine residue units.

51. The curable tackified polydiorganosiloxane oligourea segmented copolymer according to claim 49 represented by the formula:

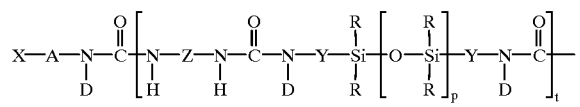

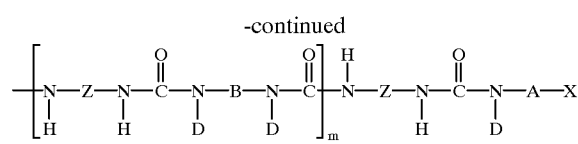

wherein:
each R is a monovalent moiety which independently is a substituted or unsubstituted alkyl moiety, (ii) a substituted or unsubstituted vinyl radical or higher alkenyl radical, (iii) a substituted or unsubstituted cycloalkyl moiety having about 6 to 12 carbon atoms, (iv) a substituted or unsubstituted aryl moiety, (v) a perfluoroalkyl group, (vi) a fluorine-containing group, or (vii) a perfluoroether-containing group;

each Z is a polyvalent radical which is (i) an arylene radical or aralkylene radical having from about 6 to 20 carbon atoms, or (ii) an alkylene or cycloalkylene radical having from about 6 to 20 carbon atoms;

each Y is a divalent moiety which independently is (i) an alkylene radical having 1 to 10 carbon atoms, or (ii) an aralkylene radical or an arylene radical having 6 to 20 carbon atoms;

each A is independently —B—, or —YSi(R)₂(OSi(R)₂)ₚY— or mixtures thereof;

B is a polyvalent radical selected from the group consisting of alkylene, aralkylene, cycloalkylene, phenylene, polyalkylene oxide and copolymers thereof, and mixtures thereof;

each D is a monovalent radical which independently is hydrogen, an alkyl radical having 1 to 10 carbon atoms, or an aryl or arylalkyl radical having about 6 to 20 carbon atoms;

each X is a moiety represented by the formula:
(a) a moiety represented by

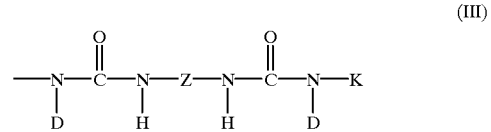

(III)

where each of Z and D are defined as above, and
K is a free radical polymerizable end group; or
(b) a moiety represented by

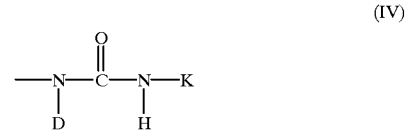

(IV)

wherein D and K are defined as above;
m is a number about 0 to 8;
p is about 10 or larger; and
t is about 2 to 12.

* * * * *